(12) United States Patent
Qu et al.

(10) Patent No.: US 12,445,897 B2
(45) Date of Patent: Oct. 14, 2025

(54) COMMUNICATION METHOD, APPARATUS, AND COMPUTER-READABLE STORAGE MEDIUM

(71) Applicant: Huawei Technologies Co., Ltd., Shenzhen (CN)

(72) Inventors: Kaiyang Qu, Hangzhou (CN); Xiaoying Xu, Shenzhen (CN); Qiang Fan, Shanghai (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 17/993,607

(22) Filed: Nov. 23, 2022

(65) Prior Publication Data

US 2023/0092723 A1 Mar. 23, 2023

Related U.S. Application Data

(63) Continuation of application No. PCT/CN2021/093926, filed on May 14, 2021.

(30) Foreign Application Priority Data

May 29, 2020 (CN) .......................... 202010478464.9

(51) Int. Cl.
  *H04W 28/02* (2009.01)
(52) U.S. Cl.
  CPC .............................. *H04W 28/0268* (2013.01)
(58) Field of Classification Search
  CPC .................................................. H04W 28/0268
  See application file for complete search history.

(56) References Cited

U.S. PATENT DOCUMENTS

| 2020/0107339 | A1  | 4/2020 | Prakash et al. |
| 2020/0136894 | A1* | 4/2020 | Bush .......................... H04L 1/08 |

FOREIGN PATENT DOCUMENTS

| CN | 108365908 A | 8/2018 |
| CN | 109845320 A | 6/2019 |
| CN | 110351201 A | 10/2019 |

(Continued)

OTHER PUBLICATIONS

"3rd Generation Partnership Project; Technical Specification Group Services and System Aspects; Study on enhanced support of Industrial Internet of Things (IIoT) in the 5G System (5GS) (Release 17)", 3GPP TR 23.700-20 V0.3.0, Technical Report, Jan. 2020, 33 Pages.

(Continued)

*Primary Examiner* — Samina F Choudhry
(74) *Attorney, Agent, or Firm* — Slater Matsil, LLP

(57) ABSTRACT

Embodiments of the present invention disclose a communication method, an apparatus, and a computer-readable storage medium. The method includes: receiving a first data packet; and sending the first data packet and first indication information to an access network device, where the first indication information indicates that the first data packet is an uplink data packet or a downlink data packet, and the first indication information is used by the access network device to determine an access network AN packet delay budget PDB of a first quality of service QoS flow corresponding to the first data packet.

20 Claims, 18 Drawing Sheets

(56) References Cited

FOREIGN PATENT DOCUMENTS

| EP | 3550878 A1 | 10/2019 | | |
|---|---|---|---|---|
| KR | 20190108165 A | * | 2/2018 | |
| WO | WO-2017088163 A1 | * | 6/2017 | .............. H04W 4/00 |
| WO | 2020068847 A1 | | 4/2020 | |

OTHER PUBLICATIONS

"3rd Generation Partnership Project; Technical Specification Group Services and System Aspects; System architecture for the 5G System (5GS); Stage 2 (Release 16)", 3GPP TS 23.501 V16.4.0, Technical Specification, Mar. 2020, 430 Pages.

"IEEE Standard for a Precision Clock Synchronization Protocol for Networked Measurement and Control Systems" IEEE Instrumentation and Measurement Society, Sponsored by the Technical Committee on Sensor Technology (TC-9), IEEE Std 1588 2008 (Revision of IEEE Std 1588-2002), Jul. 24, 2008, 289 Pages.

* cited by examiner

Bit

| Row | 8 | 7 | 6 | 5 | 4 | 3 | 2 | 1 |
|-----|---|---|---|---|---|---|---|---|
| 1 | Version | | | PT | (*) | E | S | PN |
| 2 | Message type ||||||||
| 3 | Length of the first row ||||||||
| 4 | Length of the second row ||||||||
| 5 | Tunnel endpoint identifier (tunnel endpoint identifier) of the first row ||||||||
| 6 | Tunnel endpoint identifier of the second row ||||||||
| 7 | Tunnel endpoint identifier of the third row ||||||||
| 8 | Tunnel endpoint identifier of the fourth row ||||||||
| 9 | Sequence number of the first row ||||||||
| 10 | Sequence number of the second row ||||||||
| 11 | N-PDU number ||||||||
| 12 | Next extension header type (next extension header type) ||||||||

FIG. 10

| Row | 8 | 7 | 6 | 5 | 4 | 3 | 2 | 1 | |
|---|---|---|---|---|---|---|---|---|---|
| | | | Bit | | First manner | | | | |
| 1 | Version | | | PT | Indication | E | S | PN | |
| 2 | Message type | | | | | | | | Second manner |
| 3 | Length of the first row | | | | | | | | |
| 4 | Length of the second row | | | | | | | | |
| 5 | Tunnel endpoint identifier (tunnel endpoint identifier) of the first row | | | | | | | | |
| 6 | Tunnel endpoint identifier of the second row | | | | | | | | |
| 7 | Tunnel endpoint identifier of the third row | | | | | | | | |
| 8 | Tunnel endpoint identifier of the fourth row | | | | | | | | |
| 9 | Sequence number of the first row | | | | | | | | |
| 10 | Sequence number of the second row | | | | | | | | |
| 11 | N-PDU number | | | | | | | | |
| 12 | Next extension header type (next extension header type) | | | | | | | | |
| 13 | New indication | | | | | | | | Third manner |

FIG. 11

| Message type value | Message |
|---|---|
| 1 | Echo request (echo request) |
| 2 | Echo response (echo Response) |
| 3-25 | Reserved in 3GPP TS 32.295 and 3GPP TS 29.060 (reserved in 3GPP TS 32.295 and 3GPP TS 29.060) |
| 26 | Error indication (error indication) |
| 27-30 | Reserved in 3GPP TS 29.060 (reserved in 3GPP TS 29.060) |
| 31 | Supported extension headers notification (supported extension headers notification) |
| 32-253 | Reserved in 3GPP TS 29.060 (reserved in 3GPP TS 29.060) |
| 254 | End marker (end marker) |
| 255 | G-PDU |
| 256 | Local switch |

FIG. 12

| Bit | | | | | | | | Quantity of bytes |
|---|---|---|---|---|---|---|---|---|
| 7 | 6 | 5 | 4 | 3 | 2 | 1 | 0 | |
| PDU type | | | | PDCP duplication indication | Assistance information indication | Reserved | | 1 |
| Reserved | | | | | | UL synchronization indication | PDCP duplication activation suggestion | 1 |
| Quantity of assistance information fields | | | | | | | | 1 or 0 |
| Assistance information type | | | | | | | | 0 or sum of the quantity of assistance information fields and the quantity of bytes for radio quality assistance information fields |
| Quantity of bytes for radio quality assistance information fields | | | | | | | | |
| Radio quality assistance information | | | | | | | | |
| PDCP SN/NR-U SN | | | | | | | | 0 or 3 |

FIG. 16

COMMUNICATION METHOD, APPARATUS, AND COMPUTER-READABLE STORAGE MEDIUM

CROSS-REFERENCE TO RELATED APPLICATIONS

This application is a continuation of International Application No. PCT/CN2021/093926, filed on May 14, 2021, which claims priority to Chinese Patent Application No. 202010478464.9, filed on May 29, 2020. The disclosures of the aforementioned applications are hereby incorporated by reference in their entireties.

TECHNICAL FIELD

Embodiments of the present invention relate to the field of communication technologies, and in particular, to a communication method, an apparatus, and a computer-readable storage medium.

BACKGROUND

A time sensitive network (TSN) is a new generation network standard based on the Ethernet, and provides functions such as time synchronization and delay assurance, to ensure real-time performance. Currently, in the TSN, it is specified that there is an upper limit of a residence time period of a data packet passing through a transparent clock. A 5G system (5GS) supports the TSN, and the 5GS may be used as the transparent clock in the TSN. Therefore, to meet the foregoing requirement, a protocol specifies that a residence time period of a data packet in the 5GS needs to be less than the foregoing upper limit. Currently, TSN timing in the protocol includes only a downlink timing scenario, and an uplink timing scenario is not specified. In the uplink timing scenario, a TSN grandmaster clock connected to user equipment (UE) may perform timing for a TSN node located outside a user plane function (UPF) network element, or may perform timing for a TSN node connected to another UE. In a process of performing timing for the TSN node connected to the another UE in the downlink timing scenario and the uplink timing scenario, a (radio) access network (radio access network, (R)AN) device receives a data packet from the UPF network element. Because an attribute of a quality of service (QoS) flow corresponding to a data packet is the same as an attribute of a QoS flow corresponding to a downlink data packet, the (R)AN device cannot determine whether the data packet from the UPF network element is the downlink data packet or the uplink data packet. Consequently, it cannot be ensured that a residence time period of the data packet in the 5GS meets the requirement.

SUMMARY

Embodiments of the present invention disclose a communication method, an apparatus, and a computer-readable storage medium, to ensure that a residence time period of a data packet in a 5GS meets a requirement.

According to a first aspect, a communication method is disclosed. The method may be applied to a UPF network element, or may be applied to a module (for example, a chip) in the UPF network element. The following provides descriptions by using an example in which the method is applied to the UPF network element. The method may include: The UPF network element receives a first data packet; and sends the first data packet and first indication information to an access network device, where the first indication information indicates that the first data packet is an uplink data packet or a downlink data packet, and the first indication information is used by the access network device to determine an access network (AN) packet delay budget (PDB) of a first QoS flow corresponding to the first data packet.

In this embodiment of the present invention, when sending a data packet to the access network device, the UPF network element indicates whether the data packet is an uplink data packet or a downlink data packet. In this way, after receiving the data packet, the access network device may determine, based on indication information, a type of the received data packet; and may determine, in different manners based on different types, an AN PDB of a QoS flow corresponding to the data packet, to ensure that a residence time period of the data packet in a 5GS meets a requirement.

In a possible implementation, when the first data packet is a data packet from the access network device, the first indication information indicates that the first data packet is the uplink data packet; or when the first data packet is a data packet from a TSN application server, the first indication information indicates that the first data packet is the downlink data packet.

In this embodiment of the present invention, the UPF network element may determine, based on a source of a received data packet, whether the data packet is an uplink data packet or a downlink data packet; and may include, in the data packet when sending the data packet to the access network device, indication information that indicates whether the data packet is the uplink data packet or the downlink data packet. In this way, the access network device may determine, based on the indication information, a type of the received data packet; and may determine, in different manners based on different types, an AN PDB of a QoS flow corresponding to the data packet, to ensure that a residence time period of the data packet in the 5GS meets the requirement. The type herein refers to an uplink data packet or a downlink data packet.

In a possible implementation, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on the UPF network element.

In this embodiment of the present invention, the UPF network element may determine, based on a port through which a data packet is received, whether the data packet is an uplink data packet or a downlink data packet; and may include, in the data packet when sending the data packet to the access network device, indication information that indicates whether the data packet is the uplink data packet or the downlink data packet. In this way, the access network device may determine, based on the indication information, a type of the received data packet; and may determine, in different manners based on different types, an AN PDB of a QoS flow corresponding to the data packet, to ensure that a residence time period of the data packet in the 5GS meets the requirement. The type herein refers to an uplink data packet or a downlink data packet.

In a possible implementation, the first indication information may include a general packet radio system (GPRS) tunneling protocol-user plane (GTP-U) header.

In this embodiment of the present invention, the first indication information may include the GTP-U header, and the GTP-U header in the first indication information may indicate that the first data packet is an uplink data packet or a downlink data packet.

In a possible implementation, the method may further include: receiving a second data packet, where the first data packet and the second data packet have a same service type, and an uplink or a downlink direction of the first data packet is different from an uplink or a downlink direction of the second data packet; and sending the second data packet and second indication information to the access network device, where the second indication information indicates that the second data packet is an uplink data packet or a downlink data packet, the second indication information is used by the access network device to determine an AN PDB of a second QoS flow corresponding to the second data packet, and the first QoS flow is different from the second QoS flow.

In this embodiment of the present invention, different QoS flows may be used for an uplink data packet and a downlink data packet, and the access network device may determine, in different manners based on different types, an AN PDB of a QoS flow corresponding to a data packet, to ensure that a residence time period of the data packet in the 5GS meets the requirement, and ensure validity of AN PDBs of QoS flows corresponding to data packets of different types.

In a possible implementation, the method may further include: receiving a third data packet, where the first data packet and the third data packet have a same service type, and an uplink or a downlink direction of the first data packet is different from an uplink or a downlink direction of the third data packet. The sending the first data packet and first indication information to an access network device includes: sending the first data packet, the third data packet, the first indication information, and third indication information to the access network device, where the third indication information indicates that the third data packet is an uplink data packet or a downlink data packet. That the first indication information is used by the access network device to determine an AN PDB of a first QoS flow corresponding to the first data packet includes: The first indication information and the third indication information are used by the access network device to determine an AN PDB of a first QoS flow corresponding to the first data packet and the third data packet.

In this embodiment of the present invention, a same QoS flow may be used for an uplink data packet and a downlink data packet. In this case, the access network device may determine an AN PDB of the QoS flow in a manner of using a strict requirement, to be specific, using a QoS flow corresponding to the uplink data packet as a parameter of the QoS flow, to ensure that a residence time period of the data packet in the 5GS meets the requirement.

In a possible implementation, when the first indication information indicates that the first data packet is the uplink data packet, that the first indication information is used by the access network device to determine an AN PDB of a first QoS flow corresponding to the first data packet may include: The first indication information is used by the access network device to determine, based on one or more of a residence time period of the first data packet in a device-side TSN translator (DS-TT), a residence time period of the first data packet in UE, an AN PDB of a third QoS flow, a core network (CN) PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In a possible implementation, when the first indication information indicates that the first data packet is the downlink data packet, that the first indication information is used by the access network device to determine an AN PDB of a first QoS flow corresponding to the first data packet may include: The first indication information is used by the access network device to determine, based on one or more of a residence time period of the first data packet in a DS-TT, a residence time period of the first data packet in a network-side TSN translator (NW-TT), a residence time period of the first data packet in the UPF network element, a residence time period of the first data packet in UE, and a CN PDB of the first QoS flow, the AN PDB of the first QoS flow corresponding to the first data packet.

According to a second aspect, a communication method is disclosed. The method may be applied to an access network device, or may be applied to a module (for example, a chip) in the access network device. The following provides descriptions by using an example in which the method is applied to the access network device. The method may include: receiving a first data packet and first indication information from a UPF network element, where the first indication information indicates that the first data packet is an uplink data packet or a downlink data packet; and determining, based on the first indication information, an AN PDB of a first QoS flow corresponding to the first data packet.

In this embodiment of the present invention, whether a data packet is an uplink data packet or a downlink data packet is indicated in the data packet sent by the UPF network element to the access network device. The access network device may determine, based on indication information, a type of the received data packet; and may determine, in different manners based on different types, an AN PDB of a QoS flow corresponding to the data packet, to ensure that a residence time period of the data packet in a 5GS meets a requirement.

In a possible implementation, when the first data packet is a data packet from the access network device, the first indication information indicates that the first data packet is the uplink data packet; or when the first data packet is a data packet from a TSN application server, the first indication information indicates that the first data packet is the downlink data packet.

In this embodiment of the present invention, the UPF network element may determine, based on a source of a received data packet, whether the data packet is an uplink data packet or a downlink data packet; and may include, in the data packet when sending the data packet to the access network device, indication information that indicates whether the data packet is the uplink data packet or the downlink data packet. In this way, the access network device may determine, based on the indication information, a type of the received data packet; and may determine, in different manners based on different types, an AN PDB of a QoS flow corresponding to the data packet, to ensure that a residence time period of the data packet in the 5GS meets the requirement.

In a possible implementation, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on the UPF network element.

In this embodiment of the present invention, the UPF network element may determine, based on a port through which a data packet is received, whether the data packet is an uplink data packet or a downlink data packet; and may include, in the data packet when sending the data packet to the access network device, indication information that indicates whether the data packet is the uplink data packet or the downlink data packet. In this way, the access network device may determine, based on the indication information, a type of the received data packet; and may determine, in different manners based on different types, an AN PDB of a QoS flow corresponding to the data packet, to ensure that a residence time period of the data packet in the 5GS meets the requirement. The type herein refers to an uplink data packet or a downlink data packet.

In a possible implementation, the first indication information includes a GTP-U header.

In this embodiment of the present invention, the first indication information may include the GTP-U header, and the GTP-U header in the first indication information may indicate that the first data packet is an uplink data packet or a downlink data packet.

In a possible implementation, the method may further include: receiving a second data packet and second indication information from the UPF network element, where the second indication information indicates that the second data packet is an uplink data packet or a downlink data packet, the first data packet and the second data packet have a same service type, and an uplink or a downlink direction of the first data packet is different from an uplink or a downlink direction of the second data packet; and determining, based on the second indication information, an AN PDB of a second QoS flow corresponding to the second data packet, where the first QoS flow is different from the second QoS flow.

In this embodiment of the present invention, different QoS flows may be used for an uplink data packet and a downlink data packet, and the access network device may determine, in different manners based on different types, an AN PDB of a QoS flow corresponding to a data packet, to ensure that a residence time period of the data packet in the 5GS meets the requirement, and ensure validity of AN PDBs of QoS flows corresponding to data packets of different types.

In a possible implementation, the receiving a first data packet and first indication information from a UPF network element includes: receiving the first data packet, a third data packet, the first indication information, and third indication information from the UPF network element, where the third indication information indicates that the third data packet is an uplink data packet or a downlink data packet, the first data packet and the third data packet have a same service type, and an uplink or a downlink direction of the first data packet is different from an uplink or a downlink direction of the third data packet. The determining, based on the first indication information, an AN PDB of a first QoS flow corresponding to the first data packet includes: determining, based on the first indication information and the third indication information, an AN PDB of a first QoS flow corresponding to the first data packet and the third data packet.

In this embodiment of the present invention, a same QoS flow may be used for an uplink data packet and a downlink data packet. In this case, the access network device may determine an AN PDB of the QoS flow in a manner of using a strict requirement, to be specific, using a QoS flow corresponding to the uplink data packet as a parameter of the QoS flow, to ensure that a residence time period of the data packet in the 5GS meets the requirement.

In a possible implementation, when the first indication information indicates that the first data packet is the uplink data packet, the determining, based on the first indication information, an AN PDB of a first QoS flow corresponding to the first data packet may include: determining, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In a possible implementation, when the first indication information indicates that the first data packet is the downlink data packet, the determining, based on the first indication information, an AN PDB of a first QoS flow corresponding to the first data packet may include: determining, based on one or more of a residence time period of the first data packet in a DS-TT, a residence time period of the first data packet in an NW-TT, a residence time period of the first data packet in the UPF network element, a residence time period of the first data packet in UE, and a CN PDB of the first QoS flow, the AN PDB of the first QoS flow corresponding to the first data packet.

According to a third aspect, a communication method is disclosed. The method may be applied to an access network device, or may be applied to a module (for example, a chip) in the access network device. The following provides descriptions by using an example in which the method is applied to the access network device. The method may include: receiving time synchronization information; and adjusting an air interface time synchronization precision based on the time synchronization information.

In this embodiment of the present invention, after receiving the time synchronization information, the access network device may adjust the air interface time synchronization precision based on the time synchronization information, to ensure that a 5GS time synchronization precision meets a requirement, and ensure that a TSN time synchronization precision meets the requirement.

In a possible implementation, the receiving time synchronization information may include: receiving the time synchronization information from an access and mobility management function (AMF) network element.

In this embodiment of the present invention, after receiving the time synchronization information from the AMF network element, the access network device may adjust the air interface time synchronization precision based on the time synchronization information, to ensure that the 5GS time synchronization precision meets the requirement, and ensure that the TSN time synchronization precision meets the requirement.

In a possible implementation, the receiving time synchronization information may include: receiving the time synchronization information from UE.

In this embodiment of the present invention, after receiving the time synchronization information from the UE, the access network device may adjust the air interface time synchronization precision based on the time synchronization information, to ensure that the 5GS time synchronization precision meets the requirement, and ensure that the TSN time synchronization precision meets the requirement.

In a possible implementation, the time synchronization information may be a time synchronization precision between the UE and the access network device; or may be a time synchronization precision between the UE and a UPF network element, and a time synchronization precision between the access network device and the UPF network element.

In a possible implementation, the adjusting an air interface time synchronization precision based on the time synchronization information may include: adjusting the air interface time synchronization precision when the time synchronization precision that is between the UE and the access network device and that corresponds to the time synchronization information is greater than a threshold.

In this embodiment of the present invention, when the time synchronization precision that is between the UE and the access network device and that corresponds to the time synchronization information is greater than the threshold, the air interface time synchronization precision may be adjusted, so that it can be ensured that the 5GS time synchronization precision meets the requirement, and that the TSN time synchronization precision meets the requirement.

In a possible implementation, the air interface time synchronization precision may be adjusted by sending, to the UE, indication information for adjusting a time synchronization precision, where the indication information is used by the UE to adjust the air interface time synchronization precision.

In this embodiment of the present invention, the access network device may send the indication information to the UE, so that the UE can adjust the air interface time synchronization precision based on the indication information, to ensure that the 5GS time synchronization precision meets the requirement, and that the TSN time synchronization precision meets the requirement.

In a possible implementation, that the indication information is used by the UE to adjust the air interface time synchronization precision may include: The indication information is used by the UE to perform air interface delay compensation or adjust a granularity of a timing advance (TA).

In a possible implementation, the method may further include: sending the time synchronization information to the AMF network element.

According to a fourth aspect, a communication method is disclosed. The method may be applied to an AMF network element, or may be applied to a module (for example, a chip) in the AMF network element. The following provides descriptions by using an example in which the method is applied to the AMF network element. The method may include: sending time synchronization information to an access network device, where the time synchronization information is used by the access network device to adjust an air interface time synchronization precision.

In this embodiment of the present invention, the AMF network element may send the time synchronization information to the access network device. In this way, the access network device may adjust the air interface time synchronization precision based on the time synchronization information, to ensure that a 5GS time synchronization precision meets a requirement, and ensure that a TSN time synchronization precision meets the requirement.

In a possible implementation, the time synchronization information may be a time synchronization precision between UE and the access network device; or may be a time synchronization precision between UE and a UPF network element, and a time synchronization precision between the access network device and the UPF network element.

In a possible implementation, that the time synchronization information is used by the access network device to adjust an air interface time synchronization precision may include: The time synchronization information is used by the access network device to adjust the air interface time synchronization precision when the time synchronization precision that is between the UE and the access network device and that corresponds to the time synchronization information is greater than a threshold.

In this embodiment of the present invention, when the time synchronization precision that is between the UE and the access network device and that corresponds to the time synchronization information is greater than the threshold, the air interface time synchronization precision may be adjusted, so that it can be ensured that the 5GS time synchronization precision meets the requirement, and that the TSN time synchronization precision meets the requirement.

In a possible implementation, that the access network device adjusts the air interface time synchronization precision includes: The access network device sends, to the UE, indication information for adjusting a time synchronization precision, where the indication information is used by the UE to adjust the air interface time synchronization precision.

In this embodiment of the present invention, the access network device may send the indication information to the UE, so that the UE can adjust the air interface time synchronization precision based on the indication information, to ensure that the 5GS time synchronization precision meets the requirement, and that the TSN time synchronization precision meets the requirement.

In a possible implementation, that the indication information is used by the UE to adjust the air interface time synchronization precision may include: The indication information is used by the UE to perform air interface delay compensation or adjust a granularity of a TA.

According to a fifth aspect, a communication method is disclosed. The method may be applied to UE, or may be applied to a module (for example, a chip) in the UE. The following provides descriptions by using an example in which the method is applied to the UE. The method may include: sending time synchronization information to an access network device, where the time synchronization information is used by the access network device to adjust an air interface time synchronization precision.

In this embodiment of the present invention, the UE may send the time synchronization information to the access network device. In this way, the access network device may adjust the air interface time synchronization precision based on the time synchronization information, to ensure that a 5GS time synchronization precision meets a requirement, and ensure that a TSN time synchronization precision meets the requirement.

In a possible implementation, the time synchronization information is a time synchronization precision between the UE and the access network device.

In a possible implementation, that the time synchronization information is used by the access network device to adjust an air interface time synchronization precision may include: The time synchronization information is used by the access network device to adjust the air interface time synchronization precision when the time synchronization precision that is between the UE and the access network device and that corresponds to the time synchronization information is greater than a threshold.

In this embodiment of the present invention, when the time synchronization precision that is between the UE and the access network device and that corresponds to the time synchronization information is greater than the threshold, the air interface time synchronization precision may be adjusted, so that it can be ensured that the 5GS time synchronization precision meets the requirement, and that the TSN time synchronization precision meets the requirement.

In a possible implementation, that the access network device adjusts the air interface time synchronization precision includes: The access network device sends, to the UE, indication information for adjusting a time synchronization precision, where the indication information is used by the UE to adjust the air interface time synchronization precision.

In this embodiment of the present invention, the access network device may send the indication information to the UE, so that the UE can adjust the air interface time synchronization precision based on the indication information, to ensure that the 5GS time synchronization precision meets the requirement, and that the TSN time synchronization precision meets the requirement.

In a possible implementation, that the indication information is used by the UE to adjust the air interface time synchronization precision may include: The indication information is used by the UE to perform air interface delay compensation or adjust a granularity of a TA.

In a possible implementation, the method may further include: receiving a precision difference of a DS-TT from the DS-TT; and determining the time synchronization information based on the precision difference.

According to a sixth aspect, a communication apparatus is disclosed. The communication apparatus may be a UPF network element, or may be a module (for example, a chip) in the UPF network element. The communication apparatus may include a receiving unit and a sending unit. The receiving unit is configured to receive a first data packet. The sending unit is configured to send the first data packet and first indication information to an access network device, where the first indication information indicates that the first data packet is an uplink data packet or a downlink data packet, and the first indication information is used by the access network device to determine an AN PDB of a first QoS flow corresponding to the first data packet.

In a possible implementation, when the first data packet is a data packet from the access network device, the first indication information indicates that the first data packet is the uplink data packet; or when the first data packet is a data packet from a time sensitive network application server, the first indication information indicates that the first data packet is the downlink data packet.

In a possible implementation, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on the UPF network element.

In a possible implementation, the first indication information includes a GTP-U header.

In a possible implementation, the receiving unit is further configured to receive a second data packet, where the first data packet and the second data packet have a same service type, and an uplink or a downlink direction of the first data packet is different from an uplink or a downlink direction of the second data packet. The sending unit is further configured to send the second data packet and second indication information to the access network device, where the second indication information indicates that the second data packet is an uplink data packet or a downlink data packet, the second indication information is used by the access network device to determine an AN PDB of a second QoS flow corresponding to the second data packet, and the first QoS flow is different from the second QoS flow.

In a possible implementation, the receiving unit is further configured to receive a third data packet, where the first data packet and the third data packet have a same service type, and an uplink or a downlink direction of the first data packet is different from an uplink or a downlink direction of the third data packet. That the sending unit sends the first data packet and the first indication information to the access network device includes: sending the first data packet, the third data packet, the first indication information, and third indication information to the access network device, where the third indication information indicates that the third data packet is an uplink data packet or a downlink data packet. That the first indication information is used by the access network device to determine an AN PDB of a first QoS flow corresponding to the first data packet includes: The first indication information and the third indication information are used by the access network device to determine an AN PDB of a first QoS flow corresponding to the first data packet and the third data packet.

In a possible implementation, when the first indication information indicates that the first data packet is the uplink data packet, that the first indication information is used by the access network device to determine an AN PDB of a first QoS flow corresponding to the first data packet includes: The first indication information is used by the access network device to determine, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In a possible implementation, when the first indication information indicates that the first data packet is the downlink data packet, that the first indication information is used by the access network device to determine an AN PDB of a first QoS flow corresponding to the first data packet includes: The first indication information is used by the access network device to determine, based on one or more of a residence time period of the first data packet in a DS-TT, a residence time period of the first data packet in an NW-TT, a residence time period of the first data packet in the UPF network element, a residence time period of the first data packet in UE, and a CN PDB of the first QoS flow, the AN PDB of the first QoS flow corresponding to the first data packet.

According to a seventh aspect, a communication apparatus is disclosed. The communication apparatus may be an access network device, or may be a module (for example, a chip) in the access network device. The communication apparatus may include a receiving unit and a determining unit. The receiving unit is configured to receive a first data packet and first indication information from a UPF network element, where the first indication information indicates that the first data packet is an uplink data packet or a downlink data packet. The determining unit is configured to determine, based on the first indication information, an AN PDB of a first QoS flow corresponding to the first data packet.

In a possible implementation, when the first data packet is a data packet from the access network device, the first indication information indicates that the first data packet is the uplink data packet; or when the first data packet is a data packet from a TSN application server, the first indication information indicates that the first data packet is the downlink data packet.

In a possible implementation, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on the UPF network element.

In a possible implementation, the first indication information includes a GTP-U header.

In a possible implementation, the receiving unit is further configured to receive a second data packet and second indication information from the UPF network element, where the second indication information indicates that the second data packet is an uplink data packet or a downlink data packet, the first data packet and the second data packet have a same service type, and an uplink or a downlink direction of the first data packet is different from an uplink or a downlink direction of the second data packet. The determining unit is further configured to determine, based on the second indication information, an AN PDB of a second QoS flow corresponding to the second data packet, where the first QoS flow is different from the second QoS flow.

In a possible implementation, the receiving unit is specifically configured to receive the first data packet, a third data packet, the first indication information, and third indication information from the UPF network element, where the third indication information indicates that the third data packet is an uplink data packet or a downlink data packet, the first data packet and the third data packet have a same service type, and an uplink or a downlink direction of the first data packet is different from an uplink or a downlink direction of the third data packet. The determining unit is specifically configured to determine, based on the first indication information and the third indication information, an AN PDB of a first QoS flow corresponding to the first data packet and the third data packet.

In a possible implementation, when the first indication information indicates that the first data packet is the uplink data packet, that the determining unit determines, based on the first indication information, the AN PDB of the first QoS flow corresponding to the first data packet includes: determining, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In a possible implementation, when the first indication information indicates that the first data packet is the downlink data packet, that the determining unit determines, based on the first indication information, the AN PDB of the first QoS flow corresponding to the first data packet includes: determining, based on one or more of a residence time period of the first data packet in a DS-TT, a residence time period of the first data packet in an NW-TT, a residence time period of the first data packet in the UPF network element, a residence time period of the first data packet in UE, and a CN PDB of the first QoS flow, the AN PDB of the first QoS flow corresponding to the first data packet.

According to an eighth aspect, a communication apparatus is disclosed. The communication apparatus may be an access network device, or may be a module (for example, a chip) in the access network device. The communication apparatus may include a receiving unit and an adjustment unit. The receiving unit is configured to receive time synchronization information. The adjustment unit is configured to adjust an air interface time synchronization precision based on the time synchronization information.

In a possible implementation, the receiving unit is specifically configured to receive the time synchronization information from an AMF network element.

In a possible implementation, the receiving unit is specifically configured to receive the time synchronization information from UE.

In a possible implementation, the time synchronization information is a time synchronization precision between the UE and the access network device; or a time synchronization precision between the UE and a UPF network element, and a time synchronization precision between the access network device and the UPF network element.

In a possible implementation, the adjustment unit is specifically configured to adjust the air interface time synchronization precision when the time synchronization precision that is between the UE and the access network device and that corresponds to the time synchronization information is greater than a threshold.

In a possible implementation, that the adjustment unit adjusts the air interface time synchronization precision includes: sending, to the UE, indication information for adjusting a time synchronization precision, where the indication information is used by the UE to adjust the air interface time synchronization precision.

In a possible implementation, that the indication information is used by the UE to adjust the air interface time synchronization precision includes: The indication information is used by the UE to perform air interface delay compensation or adjust a granularity of a TA.

In a possible implementation, the apparatus further includes a sending unit, configured to send the time synchronization information to the AMF network element.

According to a ninth aspect, a communication apparatus is disclosed. The communication apparatus may be an AMF network element, or may be a module (for example, a chip) in the AMF network element. The communication apparatus may include a sending unit, configured to send time synchronization information to an access network device, where the time synchronization information is used by the access network device to adjust an air interface time synchronization precision.

In a possible implementation, the time synchronization information is a time synchronization precision between UE and the access network device; or a time synchronization precision between UE and a UPF network element, and a time synchronization precision between the access network device and the UPF network element.

In a possible implementation, that the time synchronization information is used by the access network device to adjust an air interface time synchronization precision includes: The time synchronization information is used by the access network device to adjust the air interface time synchronization precision when the time synchronization precision that is between the UE and the access network device and that corresponds to the time synchronization information is greater than a threshold.

In a possible implementation, that the access network device adjusts the air interface time synchronization precision includes: The access network device sends, to the UE, indication information for adjusting a time synchronization precision, where the indication information is used by the UE to adjust the air interface time synchronization precision.

In a possible implementation, that the indication information is used by the UE to adjust the air interface time synchronization precision includes: The indication information is used by the UE to perform air interface delay compensation or adjust a granularity of a TA.

According to a tenth aspect, a communication apparatus is disclosed. The communication apparatus may be UE, or may be a module (for example, a chip) in the UE. The communication apparatus may include a sending unit, configured to send time synchronization information to an access network device, where the time synchronization information is used by the access network device to adjust an air interface time synchronization precision.

In a possible implementation, the time synchronization information is a time synchronization precision between the UE and the access network device.

In a possible implementation, that the time synchronization information is used by the access network device to adjust an air interface time synchronization precision includes: The time synchronization information is used by the access network device to adjust the air interface time synchronization precision when the time synchronization precision that is between the UE and the access network device and that corresponds to the time synchronization information is greater than a threshold.

In a possible implementation, that the access network device adjusts the air interface time synchronization precision includes: The access network device sends, to the UE, indication information for adjusting a time synchronization precision, where the indication information is used by the UE to adjust the air interface time synchronization precision.

In a possible implementation, that the indication information is used by the UE to adjust the air interface time synchronization precision includes: The indication information is used by the UE to perform air interface delay compensation or adjust a granularity of a TA.

In a possible implementation, the apparatus further includes a receiving unit and a determining unit. The receiving unit is configured to receive a precision difference of a DS-TT from the DS-TT. The determining unit is configured to determine the time synchronization information based on the precision difference.

According to an eleventh aspect, a communication apparatus is disclosed. The communication apparatus may be a UPF network element, or may be a module (for example, a chip) in the UPF network element. The communication apparatus may include a processor, a memory, an input interface, and an output interface. The memory stores a computer program, and the processor is configured to invoke the computer program stored in the memory to control the input interface and the output interface to perform corresponding operations. The input interface is configured to receive a first data packet. The output interface is configured to send the first data packet and first indication information to an access network device, where the first indication information indicates that the first data packet is an uplink data packet or a downlink data packet, and the first indication information is used by the access network device to determine an AN PDB of a first QoS flow corresponding to the first data packet.

In a possible implementation, when the first data packet is a data packet from the access network device, the first indication information indicates that the first data packet is the uplink data packet; or when the first data packet is a data packet from a TSN application server, the first indication information indicates that the first data packet is the downlink data packet.

In a possible implementation, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on the UPF network element.

In a possible implementation, the first indication information includes a GTP-U header.

In a possible implementation, the input interface is further configured to receive a second data packet. The output interface is further configured to send the second data packet and second indication information to the access network device, where the second indication information indicates that the second data packet is an uplink data packet or a downlink data packet, the second indication information is used by the access network device to determine an AN PDB of a second QoS flow corresponding to the second data packet, and the first QoS flow is different from the second QoS flow.

In a possible implementation, the input interface is further configured to receive a third data packet. That the output interface sends the first data packet and the first indication information to the access network device includes: sending the first data packet, the third data packet, the first indication information, and third indication information to the access network device, where the third indication information indicates that the third data packet is an uplink data packet or a downlink data packet. That the first indication information is used by the access network device to determine an AN PDB of a first QoS flow corresponding to the first data packet includes: The first indication information and the third indication information are used by the access network device to determine an AN PDB of a first QoS flow corresponding to the first data packet and the third data packet.

In a possible implementation, when the first indication information indicates that the first data packet is the uplink data packet, that the first indication information is used by the access network device to determine an AN PDB of a first QoS flow corresponding to the first data packet includes: The first indication information is used by the access network device to determine, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In a possible implementation, when the first indication information indicates that the first data packet is the downlink data packet, that the first indication information is used by the access network device to determine an AN PDB of a first QoS flow corresponding to the first data packet includes: The first indication information is used by the access network device to determine, based on one or more of a residence time period of the first data packet in a DS-TT, a residence time period of the first data packet in an NW-TT, a residence time period of the first data packet in the UPF network element, a residence time period of the first data packet in UE, and a CN PDB of the first QoS flow, the AN PDB of the first QoS flow corresponding to the first data packet.

According to a twelfth aspect, a communication apparatus is disclosed. The communication apparatus may be an access network device, or may be a module (for example, a chip) in the access network device. The communication apparatus may include a processor, a memory, an input interface, and an output interface. The input interface is configured to receive a first data packet and first indication information from a UPF network element, where the first indication information indicates that the first data packet is an uplink data packet or a downlink data packet. The memory stores a computer program, and the processor is configured to invoke the computer program stored in the memory to perform the following operation: determining, based on the first indication information, an AN PDB of a first QoS flow corresponding to the first data packet.

In a possible implementation, when the first data packet is a data packet from the access network device, the first indication information indicates that the first data packet is the uplink data packet; or when the first data packet is a data packet from a TSN application server, the first indication information indicates that the first data packet is the downlink data packet.

In a possible implementation, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on the UPF network element.

In a possible implementation, the first indication information includes a GTP-U header.

In a possible implementation, the input interface is further configured to receive a second data packet and second indication information from the UPF network element, where the second indication information indicates that the second data packet is an uplink data packet or a downlink data packet, the first data packet and the second data packet have a same service type, and an uplink or a downlink direction of the first data packet is different from an uplink or a downlink direction of the second data packet. The processor is further configured to invoke the computer program stored in the memory to perform the following operation: determining, based on the second indication information, an AN PDB of a second QoS flow corresponding to the second data packet, where the first QoS flow is different from the second QoS flow.

In a possible implementation, that the input interface receives the first data packet and the first indication information from the UPF network element includes: receiving the first data packet, a third data packet, the first indication information, and third indication information from the UPF network element, where the third indication information indicates that the third data packet is an uplink data packet or a downlink data packet, the first data packet and the third data packet have a same service type, and an uplink or a downlink direction of the first data packet is different from an uplink or a downlink direction of the third data packet. That the processor determines, based on the first indication information, the AN PDB of the first QoS flow corresponding to the first data packet includes: determining, based on the first indication information and the third indication information, an AN PDB of a first QoS flow corresponding to the first data packet and the third data packet.

In a possible implementation, when the first indication information indicates that the first data packet is the uplink data packet, that the processor determines, based on the first indication information, the AN PDB of the first QoS flow corresponding to the first data packet includes: determining, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In a possible implementation, when the first indication information indicates that the first data packet is the downlink data packet, that the processor determines, based on the first indication information, the AN PDB of the first QoS flow corresponding to the first data packet includes: determining, based on one or more of a residence time period of the first data packet in a DS-TT, a residence time period of the first data packet in an NW-TT, a residence time period of the first data packet in the UPF network element, a residence time period of the first data packet in user equipment UE, and a CN PDB of the first QoS flow, the AN PDB of the first QoS flow corresponding to the first data packet.

According to a thirteenth aspect, a communication method is disclosed. The communication apparatus may be an access network device, or may be a module (for example, a chip) in the access network device. The communication apparatus may include a processor, a memory, an input interface, and an output interface. The input interface is configured to receive time synchronization information. The memory stores a computer program, and the processor is configured to invoke the computer program stored in the memory to perform the following operation: adjusting an air interface time synchronization precision based on the time synchronization information.

In a possible implementation, that the input interface receives the time synchronization information includes: receiving the time synchronization information from an AMF network element.

In a possible implementation, that the input interface receives the time synchronization information includes: receiving the time synchronization information from UE.

In a possible implementation, the time synchronization information is a time synchronization precision between the UE and the access network device; or a time synchronization precision between the UE and a UPF network element, and a time synchronization precision between the access network device and the UPF network element.

In a possible implementation, that the processor adjusts the air interface time synchronization precision based on the time synchronization information includes: adjusting the air interface time synchronization precision when the time synchronization precision that is between the UE and the access network device and that corresponds to the time synchronization information is greater than a threshold.

In a possible implementation, that the processor adjusts the air interface time synchronization precision includes: The output interface sends, to the UE, indication information for adjusting a time synchronization precision, where the indication information is used by the UE to adjust the air interface time synchronization precision.

In a possible implementation, that the indication information is used by the UE to adjust the air interface time synchronization precision includes: The indication information is used by the UE to perform air interface delay compensation or adjust a granularity of a TA.

In a possible implementation, the output interface is further configured to send the time synchronization information to the AMF network element.

According to a fourteenth aspect, a communication method is disclosed. The communication apparatus may be an AMF network element, or may be a module (for example, a chip) in the AMF network element. The communication apparatus may include a processor, a memory, an input interface, and an output interface. The output interface is configured to send time synchronization information to an access network device, where the time synchronization information is used by the access network device to adjust an air interface time synchronization precision.

In a possible implementation, the time synchronization information is a time synchronization precision between UE and the access network device; or a time synchronization precision between UE and a UPF network element, and a time synchronization precision between the access network device and the UPF network element.

In a possible implementation, that the time synchronization information is used by the access network device to adjust an air interface time synchronization precision includes: adjusting the air interface time synchronization precision when the time synchronization precision that is between the UE and the access network device and that corresponds to the time synchronization information is greater than a threshold.

In a possible implementation, that the access network device adjusts the air interface time synchronization precision includes: The access network device sends, to the UE, indication information for adjusting a time synchronization precision, where the indication information is used by the UE to adjust the air interface time synchronization precision.

In a possible implementation, that the indication information is used by the UE to adjust the air interface time synchronization precision includes: The indication information is used by the UE to perform air interface delay compensation or adjust a granularity of a TA.

According to a fifteenth aspect, a communication method is disclosed. The communication apparatus may be UE, or may be a module (for example, a chip) in the UE. The communication apparatus may include a processor, a memory, an input interface, and an output interface. The output interface is configured to send time synchronization information to an access network device, where the time synchronization information is used by the access network device to adjust an air interface time synchronization precision.

In a possible implementation, the time synchronization information is a time synchronization precision between the UE and the access network device.

In a possible implementation, that the time synchronization information is used by the access network device to adjust an air interface time synchronization precision includes: adjusting the air interface time synchronization precision when the time synchronization precision that is between the UE and the access network device and that corresponds to the time synchronization information is greater than a threshold.

In a possible implementation, that the access network device adjusts the air interface time synchronization precision includes: The access network device sends, to the UE, indication information for adjusting a time synchronization precision, where the indication information is used by the UE to adjust the air interface time synchronization precision.

In a possible implementation, that the indication information is used by the UE to adjust the air interface time synchronization precision includes: The indication information is used by the UE to perform air interface delay compensation or adjust a granularity of a TA.

In a possible implementation, the input interface is configured to receive a precision difference of a DS-TT from the DS-TT. The memory stores a computer program, and the processor is configured to invoke the computer program stored in the memory to perform the following operation: determining the time synchronization information based on the precision difference.

According to a sixteenth aspect, a communication apparatus is disclosed. The communication apparatus may include an input interface, a logic circuit, and an output interface. The input interface is connected to the output interface through the logic circuit. The input interface is configured to receive information from another communication apparatus, and the output interface is configured to output, schedule, or send information to another communication apparatus. The logic circuit is configured to perform an operation other than operations performed by the input interface and the output interface. The communication apparatus may be the foregoing UPF network element or a module (for example, a chip) in the UPF network element.

According to a seventeenth aspect, a communication apparatus is disclosed. The communication apparatus may include an input interface, a logic circuit, and an output interface. The input interface is connected to the output interface through the logic circuit. The input interface is configured to receive information from another communication apparatus, and the output interface is configured to output, schedule, or send information to another communication apparatus. The logic circuit is configured to perform an operation other than operations performed by the input interface and the output interface. The communication apparatus may be the foregoing access network device or a module (for example, a chip) in the access network device.

According to an eighteenth aspect, a communication apparatus is disclosed. The communication apparatus may include an input interface, a logic circuit, and an output interface. The input interface is connected to the output interface through the logic circuit. The input interface is configured to receive information from another communication apparatus, and the output interface is configured to output, schedule, or send information to another communication apparatus. The logic circuit is configured to perform an operation other than operations performed by the input interface and the output interface. The communication apparatus may be the foregoing AMF network element or a module (for example, a chip) in the AMF network element.

According to a nineteenth aspect, a communication apparatus is disclosed. The communication apparatus may include an input interface, a logic circuit, and an output interface. The input interface is connected to the output interface through the logic circuit. The input interface is configured to receive information from another communication apparatus, and the output interface is configured to output, schedule, or send information to another communication apparatus. The logic circuit is configured to perform an operation other than operations performed by the input interface and the output interface. The communication apparatus may be the foregoing UE or a module (for example, a chip) in the UE.

According to a twentieth aspect, a computer-readable storage medium is disclosed. The computer-readable storage medium stores a computer program or computer instructions. When the computer program or the computer instructions are run, the communication method disclosed above is implemented.

According to a twenty-first aspect, a computer program product is disclosed. The computer program product includes computer program code. When the computer program code is run, the communication method disclosed above is performed.

According to a twenty-second aspect, a communication system is disclosed. The communication system may include the communication apparatus according to the sixteenth aspect and the communication apparatus according to the seventeenth aspect.

According to a twenty-third aspect, a communication system is disclosed. The communication system may include the communication apparatus according to the seventeenth aspect and the communication apparatus according to the eighteenth aspect.

According to a twenty-fourth aspect, a communication system is disclosed. The communication system may include the communication apparatus according to the seventeenth aspect and the communication apparatus according to the nineteenth aspect.

BRIEF DESCRIPTION OF THE DRAWINGS

FIG. 10 is a schematic diagram of a GTP-U header according to an embodiment of the present invention;

FIG. 11 is a schematic diagram of a GTP-U header carrying indication information according to an embodiment of the present invention;

FIG. 12 is a schematic diagram of a message type according to an embodiment of the present invention;

FIG. 16 is a schematic diagram of an F1-U interface message according to an embodiment of the present invention;

DETAILED DESCRIPTION OF ILLUSTRATIVE EMBODIMENTS

Figure 1:
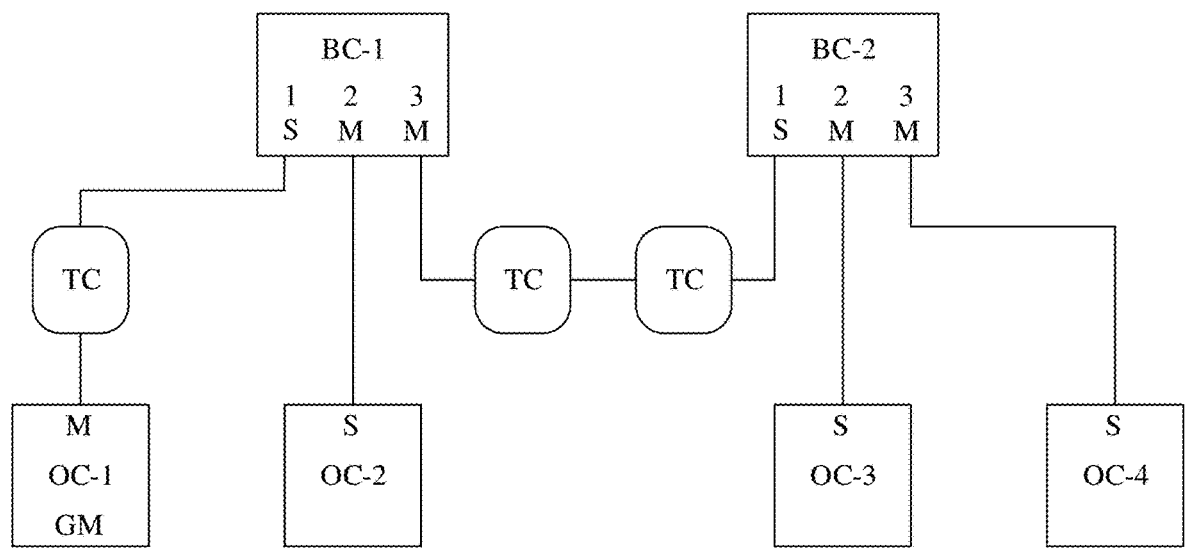
FIG. 1 is a schematic diagram of a type of a clock node in a PTP protocol according to an embodiment of the present invention.

Embodiments of the present invention disclose a communication method, an apparatus, and a computer-readable storage medium, to ensure that a residence time period of a data packet in a 5GS meets a requirement.

To better understand the communication method, the apparatus, and the computer-readable storage medium disclosed in embodiments of the present invention, the following first describes some terms or concepts in embodiments of the present invention.

1. TSN Time Synchronization Precision

The TSN time synchronization precision refers to a time offset (or time difference) between two synchronized clocks on both ends of a TSN domain. To achieve synchronization between the two clocks, a grandmaster clock on one end of the TSN domain needs to send a synchronization packet to a slave clock on the other end of the TSN domain, where the synchronization packet may include moment information of the grandmaster clock sending the synchronization packet. A 5GS may serve as a bridge, namely, a transparent clock, to transmit the synchronization packet to the slave clock, and notify the slave clock of a time delay of the synchronization packet in the 5GS. The slave clock reads the moment information in the synchronization packet and delay information of the synchronization packet transferred over a link, calculates current moment information of the corresponding grandmaster clock, and completes synchronization with the grandmaster clock. It can be learned that a precision difference of a time delay reported by the 5GS affects the TSN time synchronization precision.

2. TSN Packet Delay

The TSN packet delay refers to a time period for transferring a TSN packet over a link. The TSN packet may include a service packet and a synchronization packet. In the following, the TSN packet delay refers to a time period for transferring the TSN synchronization packet in a 5GS. The time period has an upper limit.

3. 5GS Synchronization Precision

The 5GS synchronization precision is a time offset between a grandmaster clock and a slave clock in a 5GS. The grandmaster clock may be a base station, or may be another access network device. The slave clock may be UE, or may be a UPF network element.

4. 5GS Packet Delay Budget

The 5GS packet delay budget, namely, a PDB, is an indicator of a bearer-level QoS class identifier (QCI) standard attribute in an evolved packet system (EPS). The PDB is for indicating a possible delay for transmitting a data packet between the UE and the UPF network element. For a specific QCI, a value of a PDB is the same in an uplink and a downlink direction.

5. Time Synchronization in a TSN

In an industrial control scenario, control signaling sent by a master node, such as a console, may reach a slave node, such as an operating arm, within a specified time period. The slave node may perform a corresponding action at a specified time point based on the control signaling. Therefore, an industrial control network is usually the TSN. To support time-based control in the TSN, TSN devices need to be precisely synchronized. Currently, in the TSN, the precision time protocol (PTP) or the institute of electrical and electronics engineers (IEEE) 1588 protocol is usually used for implementing precise time synchronization between the TSN devices. In the PTP protocol, timing signaling for synchronization between PTP devices is also usually referred to as a PTP message/PTP packet. Therefore, data transmitted in the TSN may include the PTP message for timing and a service-related data packet.

FIG. 1 is a schematic diagram of a type of a clock node in a PTP protocol according to an embodiment of the present invention. As shown in FIG. 1, three types of clock nodes are defined in the PTP protocol: an ordinary clock (OC), a boundary clock (BC), and a transparent clock (TC). The OC has only one clock port for communicating with a network. The OC can serve as a grandmaster clock (GM) to advertise time information to a downstream node or serve as a slave clock to synchronize time with an upstream node. The BC has a plurality of clock ports, where one port is for synchronizing time with an upstream node, and other ports are for advertising time to a downstream node. The BC needs to keep synchronized in terms of time with another node. After a PTP message reaches the BC, the BC performs clock synchronization based on the PTP message, but does not forward the PTP message through another clock port. The BC generates a PTP message and sends the PTP message through clock port M shown in FIG. 1. The TC does not need to keep synchronized in terms of time with another node. The TC has a plurality of clock ports, where a PTP packet is forwarded between these clock ports. The TC performs forwarding delay correction on the PTP packet, but does not perform time synchronization through any port. When a PTP message passes through the TC, there is a processing delay for the TC when forwarding the PTP message. When forwarding the PTP message, the TC adds a residence time period of the PTP message in the node to the PTP message. For example, the residence time period may be added to a correction field (correction field) in the PTP message. After receiving the PTP message, a TSN slave node performs synchronization on a clock of the TSN slave node based on time information and the residence time period that are in the PTP message.

6. 5GS-Supported TSN Solution

Figure 2:
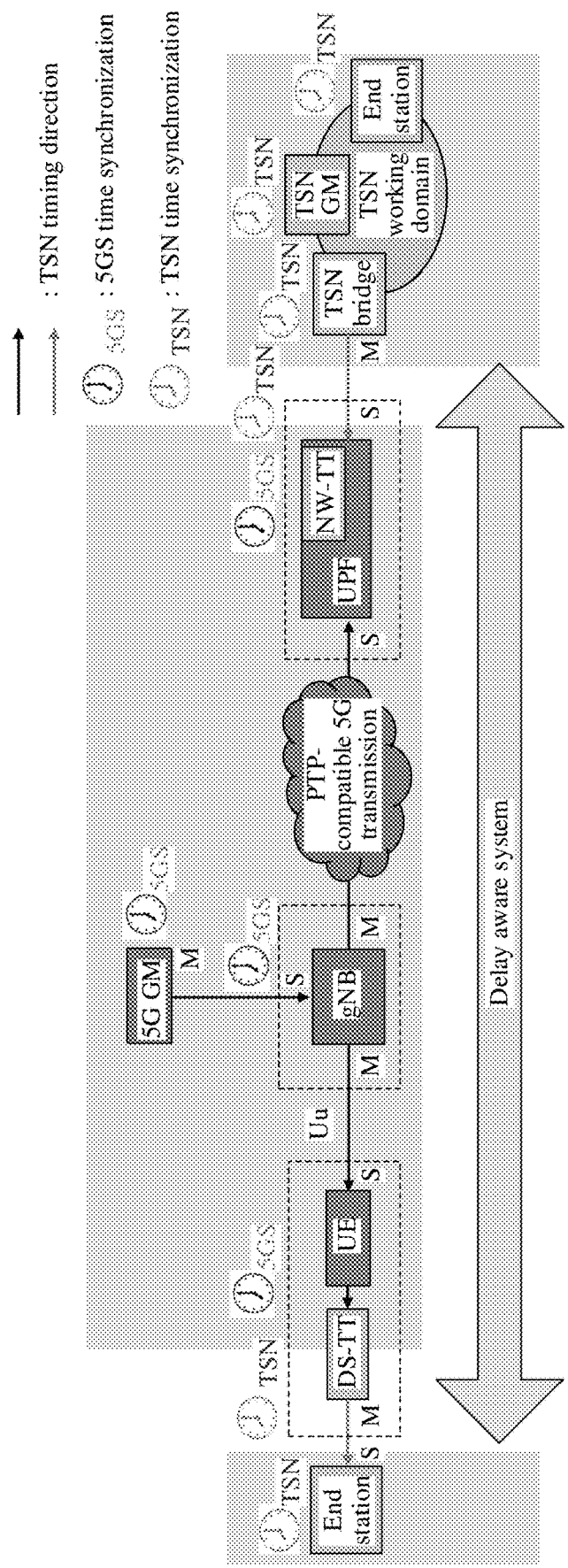
FIG. 2 is a schematic diagram of a 5GS serving as a transparent clock according to an embodiment of the present invention.

In scenarios such as industrial manufacturing, a TSN is usually used for controlling a production line. Currently, a TSN is carried on a wired network. However, a wired manner has some inherent disadvantages, such as high cable deployment costs, security risks, and low flexibility. If the wired manner is replaced by a wireless manner, especially if the wireless manner is used for the last hop in the TSN, the foregoing problems may be effectively avoided. The 5GS-supported TSN solution is discussed in 3rd generation partnership project (3GPP) Rel-16. A 5GS can be considered as a TSN bridge (bridge) device in the TSN. A TSN service data packet can be sent in an uplink or a downlink direction through the 5GS. In addition, to support the PTP protocol, the TSN requires the 5GS to adapt to the PTP protocol. The solution adopted by the 3GPP is to use the 5GS as a transparent clock. FIG. 2 is a schematic diagram of a 5GS serving as a transparent clock according to an embodiment of the present invention. As shown in FIG. 2, a PTP message sent by a TSN GM can be forwarded to a TSN end station through the 5GS. A TSN translator, for example, a UE-side TSN translator (TT), namely, a DS-TT and a UPF-side TT, namely, an NW-TT that are in FIG. 2, is needed at the border between the 5GS and a TSN to process a message related to the PTP protocol or a TSN service data packet. The DS-TT may be a processing device connected to UE, or may be a logical function of UE. The NW-TT may be a processing device connected to a UPF network element, or may be a logical function of a UPF network element.

When forwarding a PTP message, the transparent clock needs to perform correction by including, in the PTP message, a residence time period of the PTP message in the node. In order for the 5GS to obtain the residence time period of the PTP message in the 5GS, 5G clock synchronization between the UPF network element and the UE needs be ensured. The clock synchronization between the UE and the UPF network element may be ensured in a manner in which the UE and the UPF network element obtain time from a same clock source. As shown in FIG. 2, a generation NodeB (gNB) performs clock synchronization with a 5G GM. Further, the UE and the gNB may implement clock synchronization by using an air interface synchronization solution, and the UPF network element and the gNB may implement clock synchronization by using the PTP protocol. When a PTP message enters from the UPF network element side, an NW-TT includes a 5G input timestamp $t_{in}$ in the PTP message, and a DS-TT includes 5G output time $t_{out}$ in the PTP message. The DS-TT also needs to include, in the PTP message, a residence time period $(t_{out}-t_{in})$ of the PTP message in the 5GS.

In the 5GS-supported TSN solution, it is required for TSN time synchronization that a synchronization difference between a TSN GM and a TSN slave (slave) clock needs to be within 1 μs. Time synchronization of a user plane network element in the 5GS, such as the UE, the gNB, and the UPF network element, is a basis for implementing a transparent clock solution.

7. PDB

Figure 3:
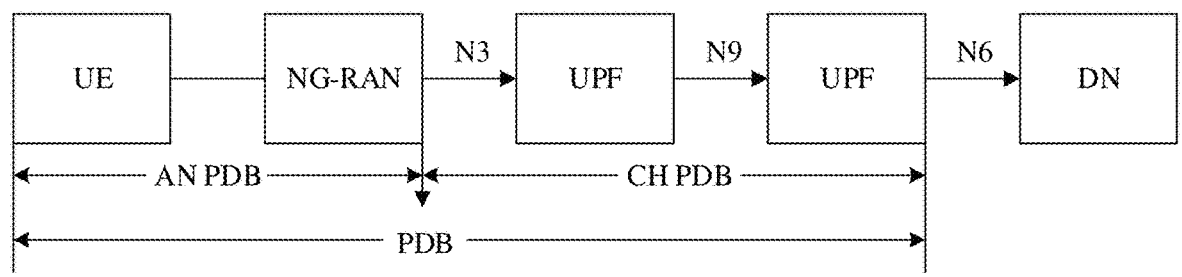
FIG. 3 is a schematic diagram of a PDB according to an embodiment of the present invention.

It is defined in a protocol that the PDB is an upper limit of a possible delay of a data packet between UE and a UPF network element. In the 3GPP, the PDB is used for supporting scheduling configuration and a link layer function. FIG. 3 is a schematic diagram of a PDB according to an embodiment of the present invention. As shown in FIG. 3, an end-to-end PDB may include a delay in an AN part, namely, an AN PDB, and a delay in a CN part, namely, a CN PDB. In a current protocol, a PDB in a 5G radio access network (RAN) (NG-RAN) is an end-to-end delay, namely, a delay between UE and an anchor UPF network element. Currently, the CN PDB is considered as a fixed value, which may be 1 ms.

8. 5G Air Interface Time Synchronization

Figure 4:
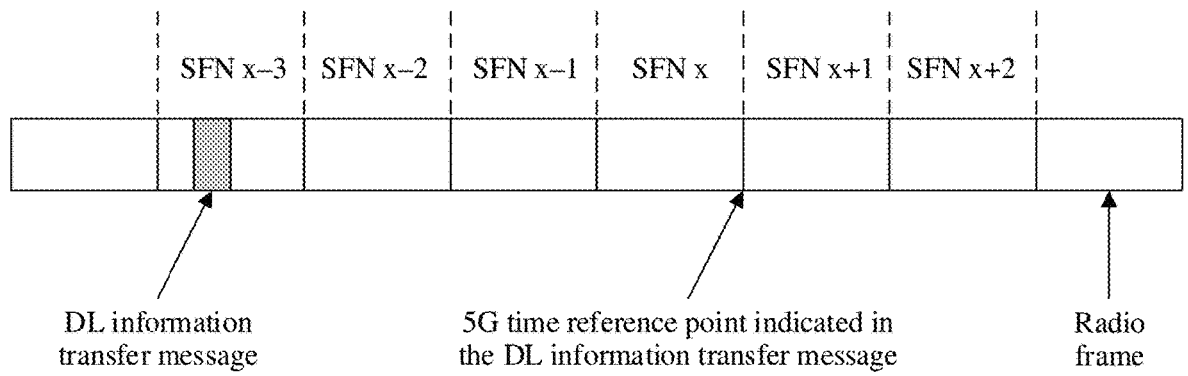
FIG. 4 is a schematic diagram of performing 5G timing by a gNB according to an embodiment of the present invention.

In the R16 standard, the 5G air interface time synchronization may be implemented by indicating, by a gNB, 5G time of a reference point to UE. The gNB may perform 5G timing for the UE in a broadcast manner, for example, by using system information; or in a unicast manner, for example, by using radio resource control (RRC) signaling. FIG. 4 is a schematic diagram of performing 5G timing by a gNB according to an embodiment of the present invention. As shown in FIG. 4, a unicast manner is used as an example for description. The gNB sends a downlink (DL) information transfer (DLInformationTransfer) message to UE in a slot in a system frame number (SFN) x−3. The DLInformationTransfer message may include specific 5G time and a time reference point SFN x. The specific 5G time may be represented as T. After receiving the DLInformationTransfer message, the UE may learn, from the DLInformationTransfer message, that 5G time corresponding to an end location of a radio frame whose SFN is x and that is closest to a moment at which the DLInformationTransfer message is received is T.

A signal sent by a base station is propagated over the air and reaches UE after a specific propagation delay. It is assumed that a downlink signal sent by the base station reaches the UE after a propagation delay $T_p$. Due to the propagation delay, a time difference $T_p$ exists between an actual frame boundary of the base station and a frame boundary determined by the UE. In the foregoing example, the UE performs 5G time synchronization based on a unicast timing message. When determining the 5G time at the end location of the radio frame whose SFN is x, the UE needs to add $T_p$ to T, to obtain actual 5G synchronization time. In other words, the UE needs to perform compensation for the propagation delay.

In an orthogonal multiple access system, to ensure orthogonality of uplink transmission and avoid intra-cell interference, a base station requires that time points at which signals, from different UE, that are in a same subframe but whose frequency domain resources are different reach the base station are basically aligned. To ensure time synchronization on a receive side, namely, a base station side, an uplink TA mechanism is used in new radio (NR). From the perspective of a UE side, a TA is, in essence, a negative offset between a start time point of receiving a downlink subframe and a time point of transmitting an uplink subframe. The base station may implement that time points at which uplink signals from different UE reach the base station are aligned by properly controlling an offset of each UE.

When the base station performs air interface timing for the UE by using the foregoing 5G air interface synchronization solution, a specific timing difference exists. The timing difference is mainly a result of a difference introduced when a signal is received and sent due to base station hardware, a difference introduced when a signal is received and sent due to UE hardware, and a difference introduced by a TA adjustment step. According to the 3GPP Rel-16 evaluation conclusion, an air interface synchronization difference between UE and a gNB is approximately 540 ns when a subcarrier spacing (SCS) is 15 kHz. The difference introduced by the TA adjustment step is approximately 260 ns.

9. Requirement for a Residence Time Period of a PTP Timing Message in a 5GS System An upper limit requirement for a residence time period of a PTP message passing through a transparent clock, which is also referred to as a delay aware system (delay aware system), is specified in the PTP protocol. An upper limit value of the residence time period may be represented as $R_{th}$. To meet the requirement, the 3GPP specifies that a sum of a PDB corresponding to a QoS flow for transmitting the PTP message and a residence time period from UE to a DS-TT needs to be less than $R_{th}$. This ensures that a total residence time period of the PTP message in the 5GS from a time point at which the PTP message enters an NW-TT from outside a UPF network element to a time point at which the PTP message is sent from the DS-TT is less than $R_{th}$.

Figure 5:
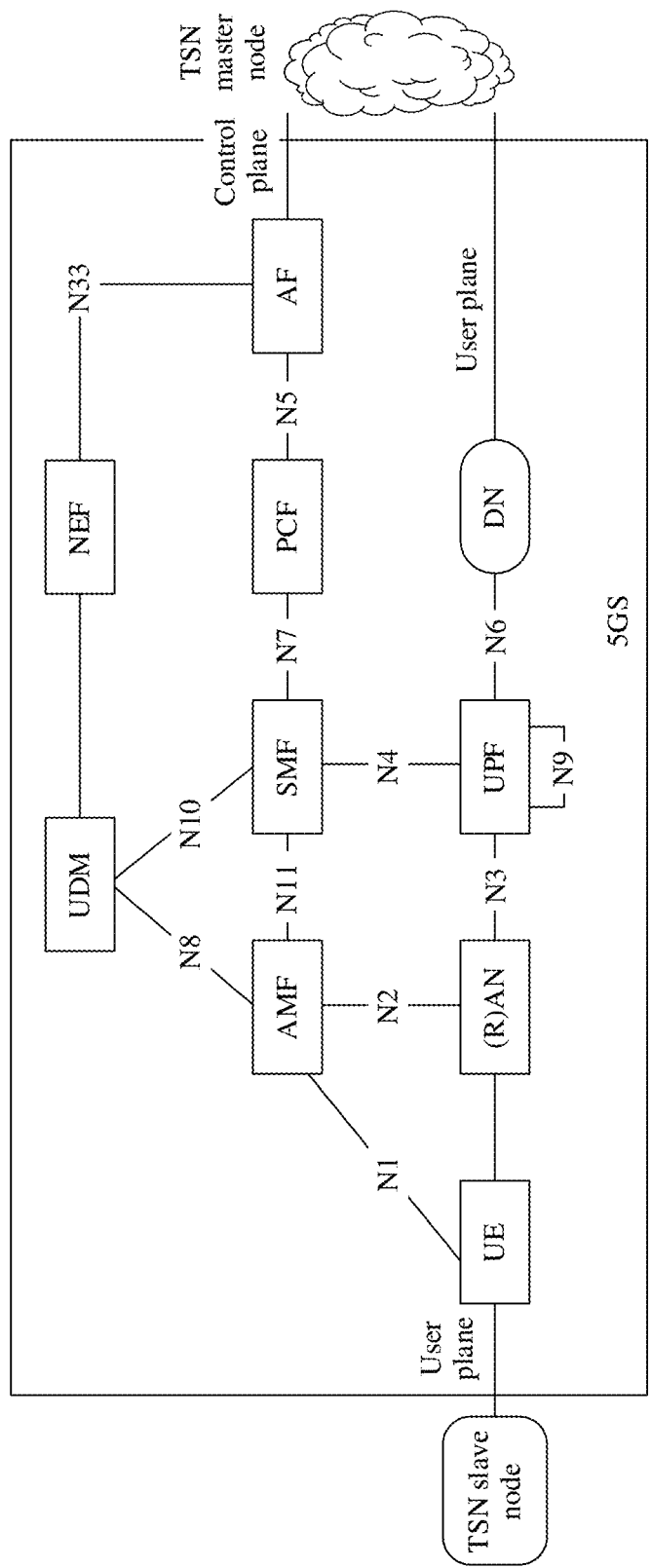
FIG. 5 is a schematic diagram of a network architecture according to an embodiment of the present invention.

To better understand the communication method, the apparatus, and the computer-readable storage medium disclosed in embodiments of the present invention, the following first describes a network architecture used in embodiments of the present invention. FIG. 5 is a schematic diagram of a network architecture according to an embodiment of the present invention. As shown in FIG. 5, the network architecture may include a TSN master node, a 5GS, and a TSN slave node. The TSN slave node may be a TSN bridge, a TSN end station, or the like. The 5GS may serve as a logical TSN bridge device for connecting the TSN master node and the TSN slave node. The 5GS may include UE, a (R)AN device, a UPF network element, a data network (DN), an AMF network element, a session management function (SMF) network element, a policy control function (PCF) network element, an application function (AF) network element, a unified data management (UDM) network element, a network exposure function (NEF) network element, and the like. The UE and the (R)AN device may directly communicate with each other. The UE may communicate with the AMF network element through an N1 interface. The (R)AN device may communicate with the AMF network element through an N2 interface. The (R)AN device may communicate with the UPF network element through an N3 interface. The UPF network element may communicate with the SMF network element through an N4 interface. The UPF network element may communicate with the DN through an N6 interface. Different UPF network elements may communicate with each other through an N9 interface. The AMF network element may communicate with the SMF network element through an N11 interface. The AMF network element may communicate with the UDM network element through an N8 interface. The SMF network element may communicate with the UDM network element through an N10 interface. The SMF network element may communicate with the PCF network element through an N7 interface. The PCF network element may communicate with the AF network element through an N5 interface. The AF network element may communicate with the NEF network element through an N33 interface. A user plane in the 5GS may include the UE, the (R)AN device, the UPF network element, and the DN. A control plane in the 5GS may include the AMF network element, the SMF network element, the PCF network element, the AF network element, the UDM network element, the NEF network element, and the like. The 5GS may be replaced with another communication system, for example, a 6GS or a future communication system.

The UPF network element may be connected to a TSN system via an NW-TT (which is not shown in FIG. 5), and the UE may be connected to the TSN bridge/end station via a DS-TT (which is not shown in FIG. 5). In a downlink direction, after a TSN service data packet reaches the NW-TT from the TSN master node, the TSN service data packet may be forwarded in the 5GS by using a protocol data unit (PDU) session between the UPF network element and the UE. Then, the UE may send the service data packet to a corresponding TSN slave node through the DS-TT. Correspondingly, in an uplink direction, after a TSN service data packet is sent from the TSN slave node to the DS-TT, the TSN service data packet may be forwarded in the 5GS by using the PDU session between the UE and the UPF network element. The UPF network element may send the service data packet to the TSN slave node through the NW-TT, or may forward the service data packet to another UE by using a PDU session with another UE, and a DS-TT of the another UE sends the service data packet to another TSN slave node.

The UE is also referred to as a terminal device, a mobile station (MS), a mobile terminal (MT), or the like, and is a device that provides voice and/or data connectivity for a user. The UE may be a handheld terminal, a notebook computer, a subscriber unit (SU), a cellular phone, a smart phone, a wireless data card, a personal communications service (PCS) phone, a session initiation protocol (SIP) phone, a subscriber station (SS), a mobile station (MB), a mobile, a remote station (RS), an access point (AP), a remote terminal (RT), an access terminal (AT), a user terminal (UT), a user agent (UA), a user device (UD), a personal digital assistant (PDA) computer, a tablet computer, a wireless modem (modem), a handheld device, a laptop computer, a cordless phone, a wireless local loop (WLL) station, a machine type communication (MTC) terminal, or another device that can access a network.

The (R)AN device is a node or a device that connects a terminal device to a network. The (R)AN device may include a RAN device and an AN device. The RAN device is a 3GPP wireless network device, and the AN device is a non 3GPP-defined access network device. The RAN device is mainly responsible for functions such as radio resource management, QoS management, and data compression and encryption on an air interface side. The RAN device may include base stations in various forms, for example, a macro base station, a micro base station (which is also referred to as a small cell), a relay station, and an access point. The AN device allows interconnection and interworking between a terminal device and a 3GPP core network using a non-3GPP technology. For example, the non-3GPP technology may be a wireless fidelity (Wi-Fi) network, a worldwide interoperability for microwave access (WiMAX) network, or a code division multiple access (CDMA) network.

The AMF network element is a core network element, and is mainly responsible for signaling processing, for example, functions such as access control, mobility management, registration, deregistration, and gateway selection. When the AMF network element provides a service for a session in UE, the AMF network element provides a control plane storage resource for the session, to store a session identifier, an SMF network element identifier associated with the session identifier, and the like.

The SMF network element is responsible for user plane network element selection; user plane network element redirection; internet protocol (internet protocol, IP) address assignment; session establishment, modification, and release; and QoS control.

The UDM network element is responsible for user key management, user identifier processing, access authorization of subscription data, network functional entity management of UE, session and service continuity management, short message push, lawful interception, subscription management, and short message management.

To better understand the communication method, the apparatus, and the computer-readable storage medium disclosed in embodiments of the present invention, the following first describes an application scenario of the present invention. Currently, the standard does not specify in detail an allocation scheme of a time synchronization precision budget in a 5GS, for example, does not specify whether a RAN device needs to control an air interface time precision based on a time precision budget from the RAN device to a core network when UE sends a TSN synchronization packet to the core network in an uplink. If no rule is imposed, the RAN device may consume an excessive time precision over an air interface. As a result, an overall 5GS time precision exceeds a threshold.

Figure 6:
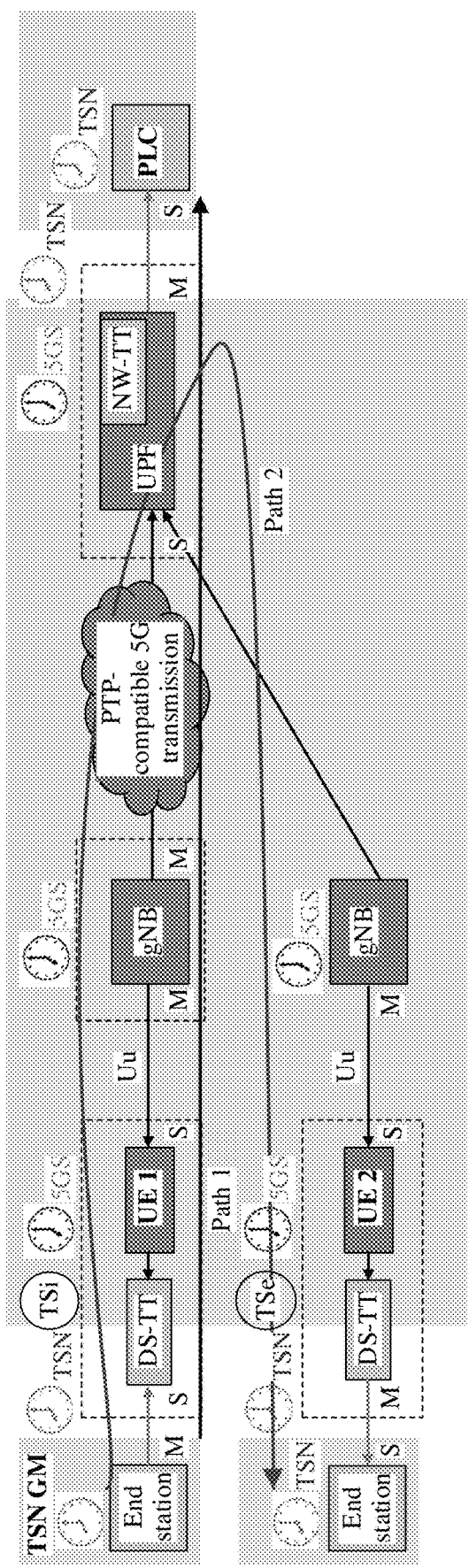
FIG. 6 is a schematic diagram of uplink timing according to an embodiment of the present invention.

In a TSN timing scenario specified in Rel-16, a grandmaster clock is located outside a UPF network element and performs timing for a TSN slave node connected to UE. This is a downlink timing scenario. FIG. 6 is a schematic diagram of uplink timing according to an embodiment of the present invention. As shown in FIG. 6, in 3GPP Rel-17, an uplink timing scenario is considered to be introduced. In this case, a grandmaster clock may be located on a TSN slave node connected to UE, and may perform timing for a TSN master node located outside a UPF network element, or may perform timing for a TSN slave node connected to another UE. A transmission path for performing timing for the TSN master node located outside the UPF network element may be path 1. A transmission path for performing timing for the TSN slave node connected to the another UE may be path 2.

As shown in FIG. 6, a GM connected to UE 1 performs TSN timing for another TSN slave node connected to UE 2. In this case, a PTP message is transmitted along the following path: UE 1→UPF network element→UE 2. To be specific, the PTP message needs to be first sent by UE 1 to the UPF network element by using an uplink QoS flow, and then sent by the UPF network element to UE 2 by using a downlink QoS flow. Local switch (local switch) occurs on a synchronization packet on the UPF network element. Compared with that for downlink timing, a residence time period of a PTP message for uplink timing in a 5GS is doubled. According to a 3GPP specification in a conventional technology, a PDB corresponding to a QoS flow for transmitting a PTP message is less than $R_{th}$. As a result, the residence time period of the PTP message in the 5GS cannot meet a requirement.

For an uplink synchronization packet and a downlink synchronization packet, because QoS flow attributes are the same, a gNB cannot distinguish whether a QoS flow of a synchronization packet transmitted from the UPF network element is specifically a downlink synchronization packet or an uplink synchronization packet that is locally switched on the UPF network element. Therefore, if the gNB determines, based only on a QoS flow attribute, a PDB of a synchronization packet received from the UPF network element, the requirement for the residence time period of the PTP message in the 5GS may not be met. For example, a packet delay budget reserved for a 5G air interface is 10 ms. In the conventional technology, an air interface PDB of a downlink synchronization packet is 10 ms, which corresponds to a process of gNB→UE. However, if the foregoing uplink synchronization scenario is introduced while the original 10 ms air interface PDB remains unchanged, an actual corresponding air interface packet delay doubles to 20 ms, which corresponds to a process of UE 1→gNB→UE 2, and the delay budget 10 ms reserved for the 5G air interface is exceeded. It can be learned that a mechanism needs to be introduced to indicate the gNB to distinguish between an uplink synchronization packet and a downlink synchronization packet, to reduce an air interface PDB of the uplink synchronization packet.

In addition, when the PTP message enters the 5GS from a UE 1-side DS-TT, the UE 1-side DS-TT includes a 5G timestamp $t_{in}$ in the PTP message, a UE 2-side DS-TT includes 5G time $t_{out}$ in the PTP message when sending the PTP message, and the UE 2-side DS-TT includes a residence time period in the 5GS $t_{out}-t_{in}$ in the PTP message. When a synchronization difference between UE 1 and the gNB is $\Delta 1$, and a synchronization difference between UE 2 and the gNB is $\Delta 1$, a synchronization difference between UE 1 and UE 2 is at least $2*\Delta 1>1$ μs. Therefore, an existing 5G air interface time synchronization solution cannot meet the foregoing requirement that a synchronization difference between a TSN grandmaster clock and a TSN slave clock is within 1 μs in the uplink timing scenario.

Figure 7:
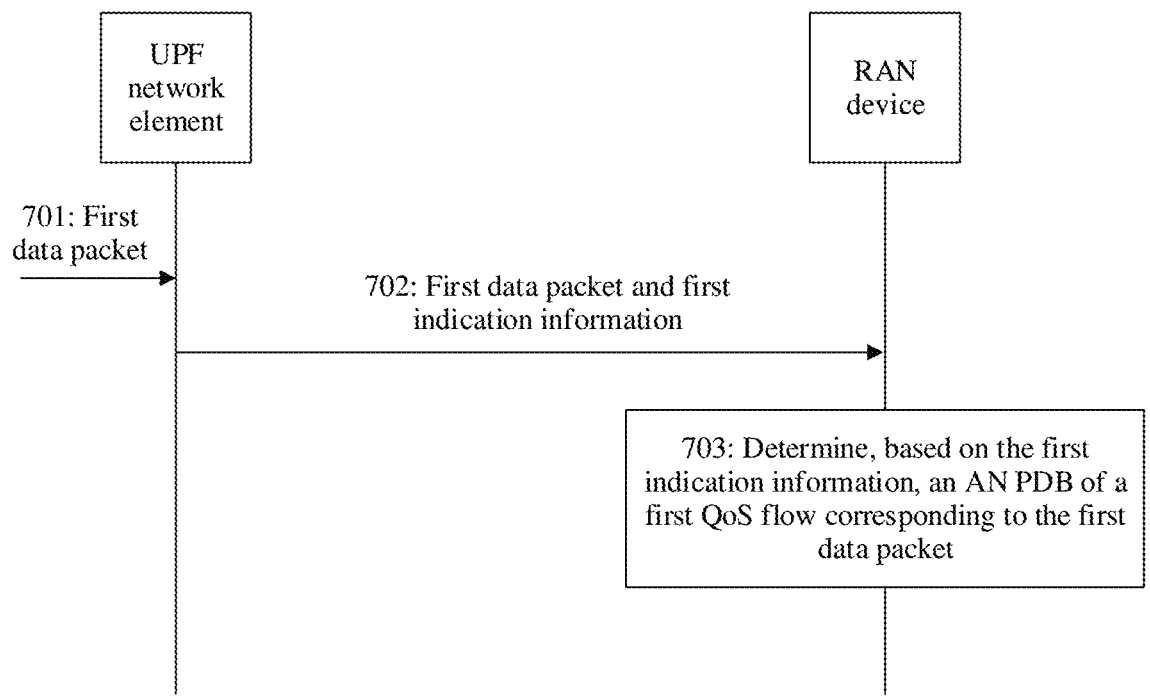
FIG. 7 is a schematic flowchart of a communication method according to an embodiment of the present invention.

Based on the foregoing network architecture, FIG. 7 is a schematic flowchart of a communication method according to an embodiment of the present invention. The following steps performed by a UPF network element may alternatively be performed by a module (for example, a chip) in the UPF network element. The following steps performed by a RAN device may alternatively be performed by a module (for example, a chip) in the RAN device. The communication method is to resolve a problem that the RAN device cannot determine whether a data packet from the UPF network element is a downlink data packet or an uplink data packet, and that it cannot be ensured that a residence time period of the data packet in a 5GS meets a requirement. As shown in FIG. 7, the communication method may include the following steps.

701: The UPF network element receives a first data packet.

The first data packet may be a data packet from the RAN device, or may be a data packet from a TSN application server. The access network device in the claims may be the RAN device, or may be a device having an equivalent function. This is not limited herein. The first data packet may be a data packet transmitted in a TSN network, the foregoing PTP message, a data packet in the TSN network, or various data packets, messages, or packets for transmitting information in the TSN network.

702: The UPF network element sends the first data packet and first indication information to the RAN device.

Accordingly, the RAN device receives the first data packet and the first indication information from the UPF network element.

After receiving the first data packet, the UPF network element may send the first data packet and the first indication information to the RAN device. The first indication information indicates that the first data packet is an uplink data packet or a downlink data packet. Specifically, whether the first data packet is the uplink data packet or the downlink data packet may be first determined, and then the first indication information may be generated depending on whether the first data packet is the uplink data packet or the downlink data packet. The UPF network element may include the first indication information in the first data packet, and send the first data packet to the RAN device. Alternatively, the UPF network element may first generate a data packet, information, an instruction, or a message that includes the first data packet and the first indication information, and then send the data packet, the information, the instruction, or the message to the RAN device. Alternatively, the UPF network element may separately send the first data packet and the first indication information to the RAN device. This is not limited herein. The first indication information may be explicitly indicated, or may be implicitly indicated. The UPF network element may determine, based on a device that sends the first data packet or a port through which the first data packet is received, whether the first data packet is the uplink data packet or the downlink data packet. The device that sends the first data packet is a device that directly sends the first data packet to the UPF network element, in other words, a device that precedes the UPF network element along a transmission path in a transmission direction of the first data packet.

703: The RAN device determines, based on the first indication information, an AN PDB of a first QoS flow corresponding to the first data packet.

After receiving the first data packet and the first indication information from the UPF network element, the RAN device may determine, based on the first indication information, the AN PDB of the first QoS flow corresponding to the first data packet. Specifically, whether the first data packet is the uplink data packet or the downlink data packet may be first determined based on the first indication information, and then the AN PDB of the first QoS flow corresponding to the first data packet may be determined based on an uplink/downlink direction of the first data packet. The first QoS flow herein is a downlink QoS flow.

Optionally, when the first data packet is the data packet from the RAN device, the first indication information may indicate that the first data packet is the uplink data packet. When the first data packet is the data packet from the TSN application server, the first indication information may indicate that the first data packet is the downlink data packet.

Figure 8:
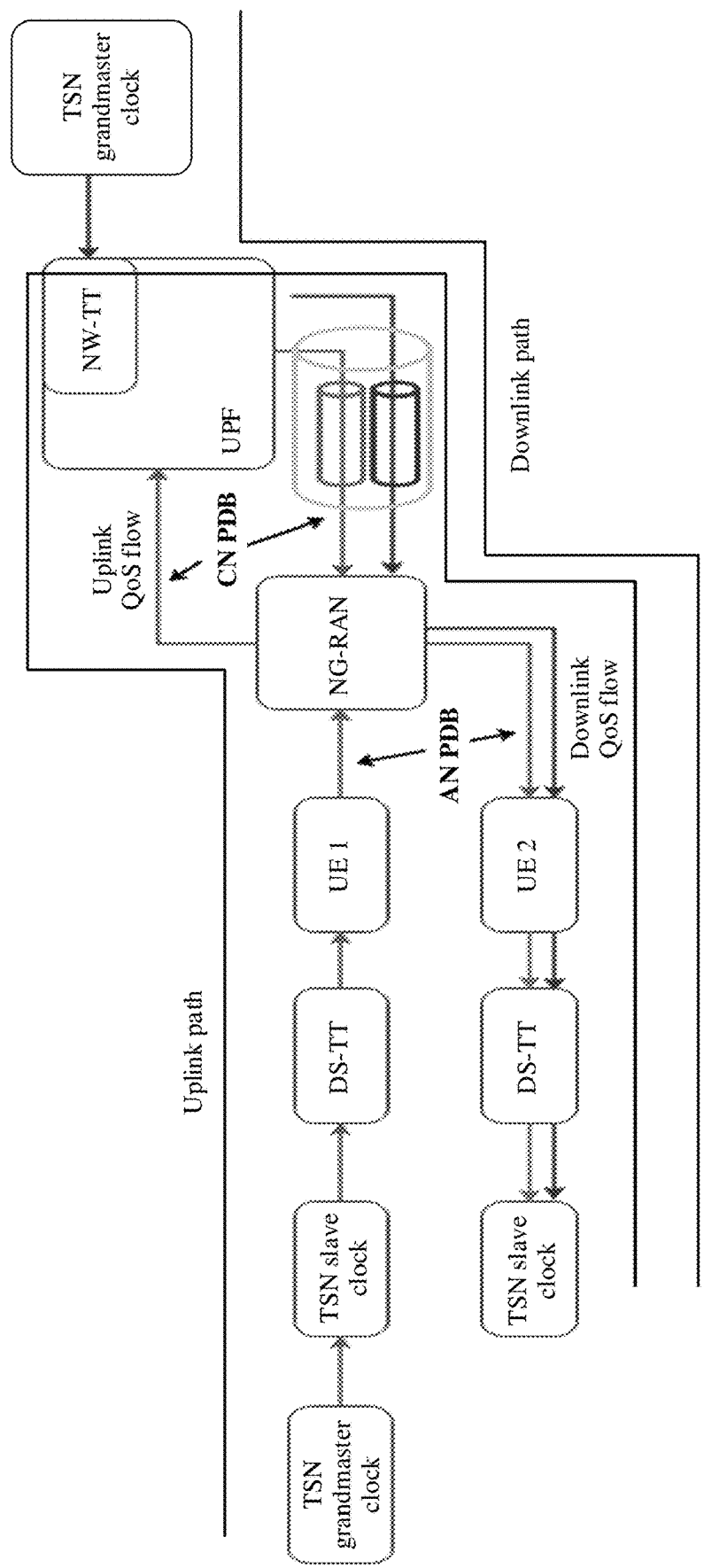
FIG. 8 is a schematic diagram of transmitting a data packet in a TSN according to an embodiment of the present invention.

FIG. 8 is a schematic diagram of transmitting a data packet in a TSN according to an embodiment of the present invention. As shown in FIG. 8, when the first data packet comes from the RAN device, the first data packet is a data packet sent by a UE 1-side TSN grandmaster clock to a UE 2-side TSN slave clock, and is an uplink data packet. When the first data packet is the data packet from the TSN application server, the first data packet is a data packet sent by a UPF network-side TSN grandmaster clock to the UE 2-side TSN slave clock, and is a downlink data packet. Therefore, the UPF network element may determine, based on the device that sends the first data packet, whether the first data packet is the uplink data packet or the downlink data packet, to generate the first indication information.

Optionally, when the first data packet is a data packet received through a first port, the first indication information indicates that the first data packet is the uplink data packet. When the first data packet is a data packet received through a second port, the first indication information indicates that the first data packet is the downlink data packet. The first port and the second port are different ports on the UPF network element.

Alternatively, the UPF network element may determine, based on the port through which the first data packet is received, whether the first data packet is the uplink data packet or the downlink data packet. The first port may be a port that is on the UPF network element and that is configured to communicate with the RAN device. The second port may be a port that is on the UPF network element and that is configured to communicate with the TSN application server.

Optionally, the first indication information may include a GTP-U header.

Figure 9:
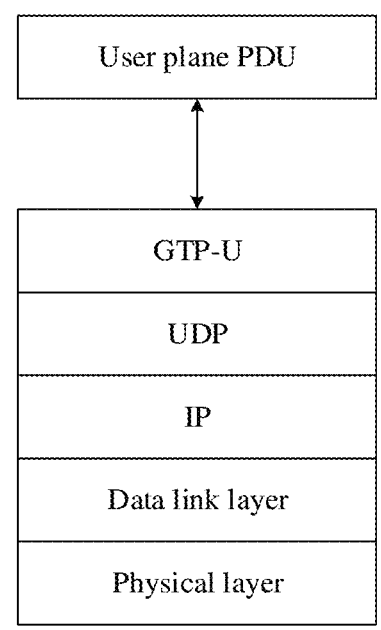
FIG. 9 is a schematic diagram of an NG-U protocol stack according to an embodiment of the present invention.

The UPF network element may add indication information to a GTP-U header of a 5G (NG) user plane interface (NG-U) data packet that is sent to an NG-RAN device. The UPF network element may specifically notify, by using the indication information, the RAN device whether a synchronization packet sent from the UPF network element is locally switched on the UPF network element. When the local switch occurs, it indicates that the data packet is an uplink data packet. When the local switch does not occur, it indicates that the data packet is a downlink data packet. FIG. 9 is a schematic diagram of an NG-U protocol stack according to an embodiment of the present invention. As shown in FIG. 9, the NG-U protocol stack is a specific protocol stack of a data packet sent by the UPF network element to the NG-RAN device in a protocol. The NG-U protocol stack may include a user plane PDU (PDU), a GTP-U header, a user datagram protocol (UDP), an IP, a data link layer, and a physical layer. The GTP-U header is located at the second layer of the protocol stack. The UPF network element adds the GTP-U header to a lower layer of the protocol stack, places a data packet above the GTP-U header, and finally sends the entire data packet to the NG-RAN. FIG. 10 is a schematic diagram of a GTP-U header according to an embodiment of the present invention. As shown in FIG. 10, the first row of the GTP-U header includes eight bits. The first bit is an N-PDU number flag (PN), and is for identifying whether the PN exists. The second bit is an extension header flag (E), and is for identifying whether the E exists. The third bit is a sequence number flag (sequence number flag, S), and is for identifying whether the S exists. The fourth bit is an idle bit. The fifth bit indicates a protocol type (PT). The sixth bit to the eighth bit indicate a version. The second row indicates a message type. FIG. 11 is a schematic diagram of a GTP-U header carrying indication information according to an embodiment of the present invention. As shown in FIG. 11, the GTP-U header may carry the indication information in three manners. In the first manner, the indication information may be added to the fourth bit in the first row, to indicate whether a data packet is locally switched. For example, when the bit is 0, it may indicate that the local switch occurs; or when the bit is 1, it may indicate that the local switch does not occur; and vice versa. In the second manner, a message type in the second row may indicate whether a data packet is locally switched. The message type may carry the indication information in two manners. One manner is as follows: An existing field may be modified, and a part of message type values are redefined as a "local switch message" and/or a "non local switch message". The other manner is as follows: A message type value is added to correspond to a "local switch message", and another message type value corresponds to a non local switch message by default. FIG. 12 is a schematic diagram of a message type according to an embodiment of the present invention. As shown in FIG. 12, 1 to 255 are existing parts in an existing protocol, and 256 may be added to an existing message type table, to indicate a message type of "whether local switch occurs". In the third manner, a row indicating whether local switch occurs is added. The newly added row may include X bits. The X bits may be used for defining a mapping relationship between a type, a corresponding bit representation manner, and whether the local switch occurs. For example, assuming that X is 8, when the eight bits are 00000001, it indicates that the local switch occurs; or when the eight bits are 00000000, it indicates that the local switch does not occur.

Optionally, the method may further include: The UPF network element receives a second data packet, and sends the second data packet and second indication information to the RAN device. The RAN device receives the second data packet and the second indication information that are from the UPF network element, and determines, based on the second indication information, an AN PDB of a second QoS flow corresponding to the second data packet. The first data packet and the second data packet have a same service type. For example, both the first data packet and the second data packet are TSN packets for timing. An uplink or a downlink direction of the first data packet is different from an uplink or a downlink direction of the second data packet. To be specific, when the first data packet is an uplink data packet, the second data packet is a downlink data packet; or when the first data packet is a downlink data packet, the second data packet is an uplink data packet. The first QoS flow is different from the second QoS flow. In other words, the first QoS flow and the second QoS flow are different QoS flows, that is, the first QoS flow and the second QoS flow are not a same QoS flow. It can be learned that an uplink data packet and a downlink data packet may be transmitted by using different QoS flows. When an uplink data packet and a downlink data packet are transmitted by using different QoS flows, after receiving a data packet, the RAN device may determine, based on indication information, that the data packet is an uplink/downlink data packet. Then, when the data packet is the uplink data packet, an AN PDB with a small absolute value may be assigned to a QoS flow corresponding to the data packet; or when the data packet is the downlink data packet, an AN PDB with a large absolute value may be assigned to a QoS flow corresponding to the data packet. For example, a 10 ms AN PDB may be assigned to a QoS flow corresponding to a downlink data packet, and a 5 ms AN PDB may be assigned to a QoS flow corresponding to an uplink data packet.

The method may further include: The UPF network element receives a third data packet. Step 702 may include: sending the first data packet, the third data packet, the first indication information, and third indication information to an access network device. That the RAN device receives the first data packet and the first indication information from the UPF network element may include: The RAN device receives the first data packet, the third data packet, the first indication information, and the third indication information from the UPF network element. Step 703 may include: determining, based on the first indication information and the third indication information, an AN PDB of a first QoS flow corresponding to the first data packet and the third data packet. It can be learned that an uplink data packet and a downlink data packet may be transmitted by using a same QoS flow. Specifically, types of two or more data packets transmitted by using a same QoS flow may be first determined, to be specific, whether each of the data packets transmitted by using the same QoS flow is an uplink data packet or a downlink data packet is determined. Then, an AN PDB of the QoS flow is determined based on the types of the data packets transmitted by using the QoS flow. When the first indication information indicates that the first data packet is an uplink data packet and the third indication information indicates that the third data is a downlink data packet, or when the first indication information indicates that the first data packet is a downlink data packet and the third indication information indicates that the third data packet is an uplink data packet, it indicates that both the uplink data packet and the downlink data packet are transmitted by using a same QoS flow. In this case, an AN PDB with a small absolute value may be determined for the AN PDB of the first QoS flow corresponding to the first data packet and the third data packet. A path of the uplink data packet is longer than a path of the downlink data packet. Therefore, to ensure that a residence time period of the uplink data packet in a 5GS meets a requirement, when the uplink data packet and the downlink data packet are transmitted by using a same QoS flow, an AN PDB of the QoS flow is determined by determining a QoS flow corresponding to the uplink data packet. To be specific, an AN PDB with a small absolute value is assigned to the QoS flow corresponding to the data packet. In this way, it can be ensured that a data packet with a longest path meets the requirement, in other words, it can be ensured that a data packet with a largest delay can meet the requirement, or in other words, it can be ensured that a data packet that passes through two hops (or multiple hops) of an air interface in the QoS flow meets a packet delay budget of the air interface, so that it can be ensured that all data packets transmitted by using the QoS flow meet the requirement. Because a larger quantity of hops of an air interface through which a data packet passes indicates a larger delay of the data packet, when a PDB corresponding to a data packet passing through two hops (or multiple hops) of an air interface is met, a PDB corresponding to a data packet passing through one hop of the air interface can be definitely met. For example, when a PDB of an uplink data packet in a QoS flow is 5 ms, and a PDB of a downlink data packet in the QoS flow is 10 ms, the 5 ms PDB is assigned to the QoS flow.

Optionally, when the first indication information indicates that the first data packet is the uplink data packet, step 704 may include: The RAN device determines, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet. The third QoS flow is an uplink QoS flow corresponding to the first data packet.

As shown in FIG. 8, when the TSN grandmaster clock connected to UE 1 performs timing for the slave clock connected to UE 2, a transmission path of a data packet may be UE 1-RAN device-UPF network element-RAN device-UE 2. The data packet may be transmitted between UE 1 and the UPF network element by using an uplink QoS flow, and may be transmitted between the UPF network element and UE 2 by using a downlink QoS flow. It can be learned that an uplink data packet that is locally switched on the UPF network element is transmitted in the 5GS by using two QoS flows. It can be learned from the foregoing that the 5GS may serve as a transparent clock in a TSN, and an upper limit value of a residence time period of a data packet in the 5GS is specified in a standard. Therefore, after receiving the first data packet from the UPF network element, the RAN device may determine, based on one or more of residence time periods of the first data packet in UE 1, UE 2, the RAN device, and the UPF network element, PDBs (including an AN PDB and a CN PDB) of an uplink QoS flow corresponding to the first data, and a CN PDB of a downlink QoS flow corresponding to the first data packet, an AN PDB of the downlink QoS flow corresponding to the first data packet. When the DS-TT belongs to the 5GS, after receiving the first data packet from the UPF network element, the RAN device may determine, based on one or more of residence time periods of the first data packet in the DS-TT, UE 1, UE 2, the RAN device, and the UPF network element, PDBs (including an AN PDB and a CN PDB) of an uplink QoS flow corresponding to the first data, and a CN PDB of a downlink QoS flow corresponding to the first data packet, an AN PDB of the downlink QoS flow corresponding to the first data packet. The residence time period in the DS-TT may include a residence time period in a DS-TT connected to UE 1 and a residence time period in a DS-TT connected to UE 2. When the AN PDB of the downlink QoS flow corresponding to the first data packet is determined, the foregoing upper limit value may be further used. The residence time period in the RAN device may include a residence time period in the RAN device in a process of UE 1-RAN device-UPF network element, and a residence time period in the RAN device in a process of UPF network element-RAN device-UE 2. When UE 1 and UE 2 are connected to different UPF network elements, a residence time period in the UPF network elements may include a residence time period in the two UPF network elements and a transmission time period between the two UPF network elements.

Optionally, when the first indication information indicates that the first data packet is the downlink data packet, step 704 may include: The RAN device may determine, based on one or more of a residence time period of the first data packet in a DS-TT, a residence time period of the first data packet in an NW-TT, a residence time period of the first data packet in the UPF network element, a residence time period of the first data packet in UE, and a CN PDB of the first QoS flow, the AN PDB of the first QoS flow corresponding to the first data packet.

As shown in FIG. 8, when the TSN grandmaster clock connected to the UPF network element performs timing for the TSN slave clock connected to UE 2, a transmission path of a data packet may be UPF network element-RAN device-UE 2. Therefore, after receiving the first data packet from the UPF network element, the RAN device may determine, based on one or more of residence time periods of the first data packet in UE 2, the RAN device, and the UPF network element, and a CN PDB of a downlink QoS flow corresponding to the first data packet, an AN PDB of the downlink QoS flow corresponding to the first data packet. When the DS-TT and the NW-T belong to the 5GS, after receiving the second data packet from the UPF network element, the RAN device may determine, based on one or more of residence time periods of the first data packet in UE 2, the DS-TT, the NW-TT, the RAN device, and the UPF network element, and a CN PDB of a downlink QoS flow corresponding to the first data packet, an AN PDB of the downlink QoS flow corresponding to the first data packet. When the AN PDB of the downlink QoS flow corresponding to the first data packet is determined, the foregoing upper limit value may be further used.

Optionally, as shown in FIG. 8, it can be learned from an existing standard that a PDB of an uplink QoS flow includes a transmission time period from UE 1 to the UPF network element (in other words, includes an AN PDB and a CN PDB), and a PDB of a downlink QoS flow includes a transmission time period from the UPF network element to UE 2 (in other words, includes an AN PDB and a CN PDB). This manner is used as an example in the foregoing embodiment. Actually, when the PDB is defined, in addition to the foregoing part, time in another part may be further included. Specifically, the PDB of the uplink QoS flow may include one or any combination of more of a residence time period of a data packet in a DS-TT, a residence time period of the data packet in UE 1, a transmission time period from UE 1 to the UPF network element, and a time period of uplink processing of the data packet by the UPF network element. The PDB of the downlink QoS flow may include one or any combination of more of a time period of downlink processing of a data packet by the UPF network element, a transmission time period from the UPF to UE 2, a residence time period in UE 2, and a residence time period in a DS-TT. For example, a PDB definition may be as follows: A PDB of an uplink QoS flow may include a residence time period of a data packet in UE 1, a transmission time period from UE 1 to the UPF, and a time period of uplink processing of the data packet by the UPF network element; and a PDB of a downlink QoS flow may include a time period of downlink processing of a data packet by the UPF network element, a transmission time period from the UPF to UE 2, and a residence time period in UE 2. In this PDB definition, the 5GS needs to ensure that a sum of a residence time period of a data packet in the UE 1-side DS-TT, a residence time period of the data packet in the UE 2-side DS-TT, a PDB of QoS flow 1, and a PDB of QoS flow 2 is less than or equal to $R_{th}$.

Figure 13:
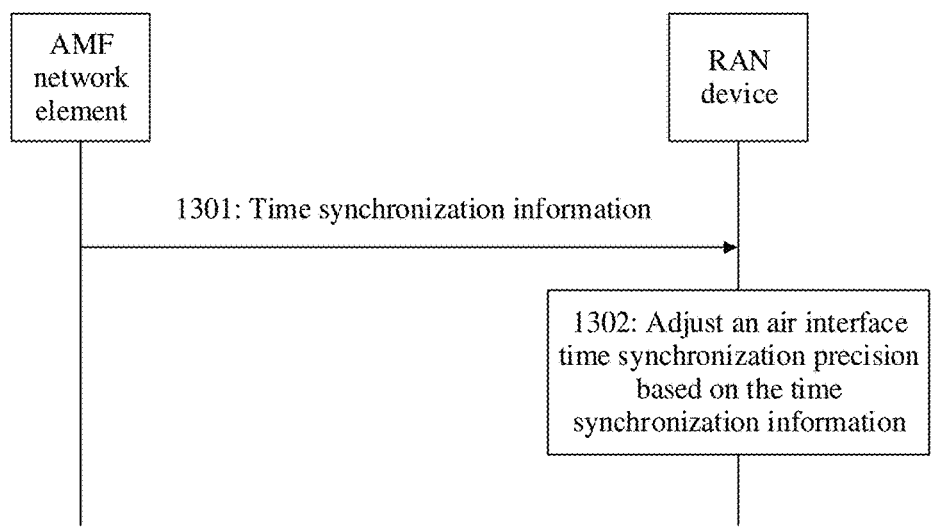
FIG. 13 is a schematic flowchart of another communication method according to an embodiment of the present invention.

Based on the foregoing network architecture, FIG. 13 is a schematic flowchart of another communication method according to an embodiment of the present invention. The following steps performed by UE may alternatively be performed by a module (for example, a chip) in the UE. The following steps performed by a RAN device may alternatively be performed by a module (for example, a chip) in the RAN device. The following steps performed by an AMF network element may alternatively be performed by a module (for example, a chip) in the AMF network element. The method may be applied to a downlink timing scenario and/or an uplink timing scenario. The communication method is to resolve a problem that a synchronization difference between a TSN grandmaster clock and a TSN slave clock cannot meet a requirement. As shown in FIG. 13, the communication method may include the following steps.

1301: The AMF network element sends time synchronization information to the RAN device.

The AMF network element may send the time synchronization information to the RAN device in real time or periodically, or may send the time synchronization information to the RAN device when an air interface time synchronization precision needs to be adjusted. The AMF network element may include the time synchronization information in a message and send the message to the RAN device, for example, may include the time synchronization information in an N2 message. Alternatively, the AMF network element may directly send the time synchronization information to the RAN device.

Accordingly, the RAN device receives the time synchronization information from the AMF network element.

1302: The RAN device adjusts the air interface time synchronization precision based on the time synchronization information.

After receiving the time synchronization information from the AMF network element, the RAN device may adjust the air interface time synchronization precision based on the time synchronization information. The RAN device may increase the air interface time synchronization precision, or reduce the air interface time synchronization precision.

Optionally, the time synchronization information may be a time synchronization precision between UE and the RAN device; or may be a time synchronization precision between UE and a UPF network element, and a time synchronization precision between the access network device and the UPF network element.

Figure 14:
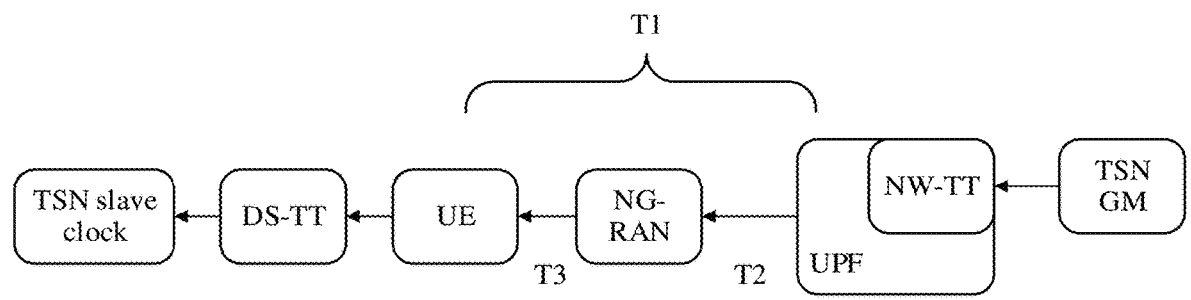
FIG. 14 is a schematic diagram of time synchronization information of downlink timing according to an embodiment of the present invention.

FIG. 14 is a schematic diagram of time synchronization information of downlink timing according to an embodiment of the present invention. As shown in FIG. 14, T1 is the time synchronization precision between the UE and the UPF network element, T2 is the time synchronization precision between the RAN device and the UPF network element, and T3 is the time synchronization precision between the UE and the RAN device. The time synchronization information may be T3, or may be T1 and T2, where T1=T2+T3.

Optionally, step 1302 may include: adjusting the air interface time synchronization precision when the time synchronization precision that is between the UE and the RAN device and that corresponds to the time synchronization information is greater than a threshold.

After receiving the time synchronization information from the AMF network element, if the time synchronization information is the time synchronization precision between the UE and the RAN device, the RAN device may determine whether the time synchronization precision between the UE and the RAN device is greater than the threshold. When the RAN device determines that the time synchronization precision between the UE and the RAN device is greater than the threshold, the RAN device may adjust the air interface time synchronization precision, to be specific, increase the air interface time synchronization precision. When the RAN device determines that the time synchronization precision between the UE and the RAN device is less than or equal to the threshold, the RAN device may adjust the air interface time synchronization precision, to be specific, reduce the air interface time synchronization precision or keep the air interface time synchronization precision unchanged. When the time synchronization information is the time synchronization precision between the UE and the UPF network element and the time synchronization precision between the access network device and the UPF network element, the time synchronization precision between the UE and the RAN device may be first obtained through calculation based on the time synchronization precision between the UE and the UPF network element and the time synchronization precision between the access network device and the UPF network element, and then whether the time synchronization precision between the UE and the RAN device is greater than the threshold is determined.

Optionally, that the RAN device adjusts the air interface time synchronization precision may include: The RAN device may send, to the UE, indication information for adjusting a time synchronization precision, where the indication information is used by the UE to adjust the air interface time synchronization precision. Specifically, the RAN device may send, to the UE, indication information for increasing the time synchronization precision, where the indication information is used by the UE to increase the air interface time synchronization precision; or may send, to the UE, indication information for reducing the time synchronization precision, where the indication information is used by the UE to reduce the air interface time synchronization precision.

Optionally, that the indication information is used by the UE to adjust the air interface time synchronization precision may include: The indication information is used by the UE to perform air interface delay compensation or adjust a granularity of a TA. Specifically, that the indication information is used by the UE to increase the air interface time synchronization precision may include: The indication information is used by the UE to perform air interface delay compensation or reduce the granularity of the TA. That the indication information is used by the UE to reduce the air interface time synchronization precision may include: The indication information is used by the UE to perform air interface delay compensation or increase the granularity of the TA.

Figure 15:
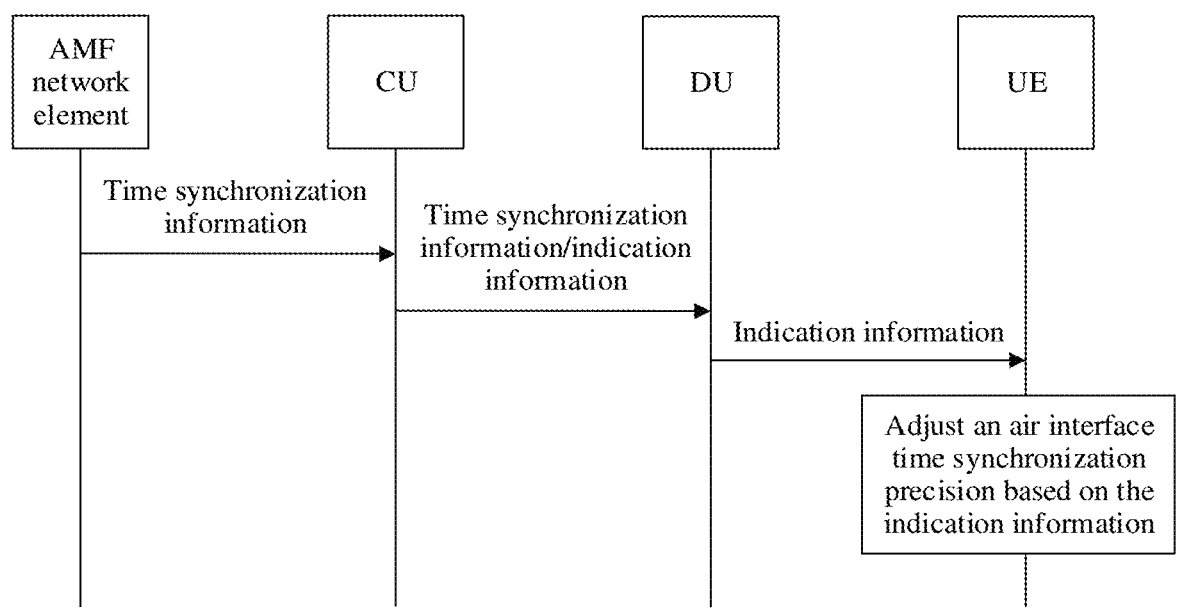
FIG. 15 is a schematic flowchart of still another communication method according to an embodiment of the present invention.

The RAN device may be split into a central unit (CU) and a distributed unit (DU), or may be centralized. FIG. 15 is a schematic flowchart of still another communication method according to an embodiment of the present invention. As shown in FIG. 15, after receiving time synchronization information from an AMF network element, a CU may determine, based on the time synchronization information, whether an air interface time synchronization precision needs to be adjusted, and then may send a result to a DU, or may directly forward the time synchronization information to a DU. The CU may include to-be-sent information in an F1 access point (AP) message and send the message to the DU through an F1 interface. For example, information may be sent in a newly added indication field uplink (UL) synchronization indication (UL sync indication) in a UE context setup request (UE CONTEXT SETUP REQUEST) message in a UE context setup (UE context setup) process, a UE context modification request (UE CONTEXT MODIFICATION REQUEST) message in a UE context modification (UE context modification) process, or a UE context modification confirm (UE CONTEXT MODIFICATION CONFIRM) message in a UE context modification required (UE context modification required) process. FIG. 16 is a schematic diagram of an F1-U interface message according to an embodiment of the present invention. As shown in FIG. 16, a bit originally reserved in the F1-U interface message for UL synchronization indication may be used to send the foregoing information. When the CU sends, to the DU, indication information for adjusting the air interface time synchronization precision, and if the field exists, it indicates that the CU indicates, to the DU, that UE needs to adjust the air interface time synchronization precision; or if the field does not exist, it indicates that no adjustment needs to be performed. When the information sent by the CU to the DU is the time synchronization information, different values of this field may indicate different values of the time synchronization information. In addition, the CU may further store the time synchronization information for subsequent invocation, for example, for performing air interface precision budgeting, to reserve a sufficient time synchronization precision between a RAN device and a UPF network element. After receiving the information from the CU, the DU may determine, based on the received information, whether the air interface time synchronization precision needs to be adjusted. When it is determined that the air interface time synchronization precision is to be adjusted, the DU may send indication information to the UE. After receiving the indication information from the DU, the UE may adjust the air interface time synchronization precision based on the indication information.

Figure 17:
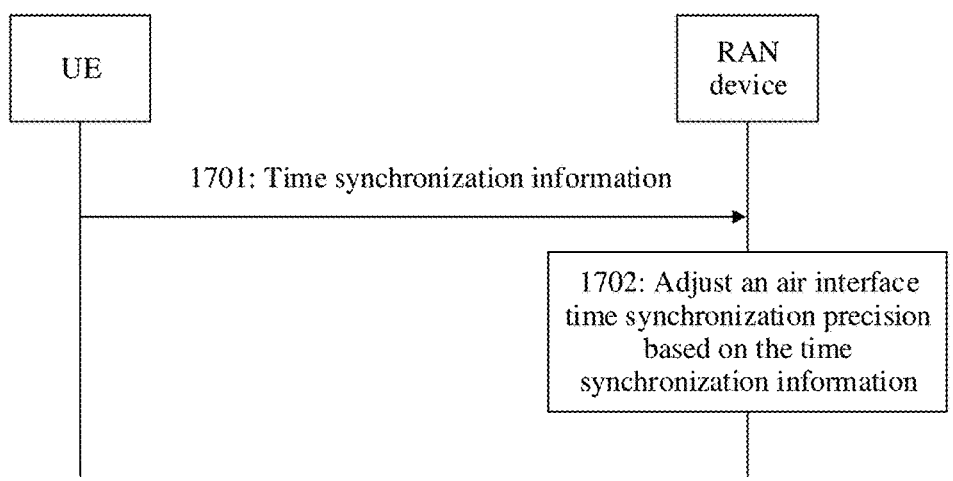
FIG. 17 is a schematic flowchart of still another communication method according to an embodiment of the present invention.

Based on the foregoing network architecture, FIG. 17 is a schematic flowchart of still another communication method according to an embodiment of the present invention. The following steps performed by UE may alternatively be performed by a module (for example, a chip) in the UE. The following steps performed by a RAN device may alternatively be performed by a module (for example, a chip) in the RAN device. The following steps performed by an AMF network element may alternatively be performed by a module (for example, a chip) in the AMF network element. The method may be applied to a downlink timing scenario and an uplink timing scenario. The communication method is to resolve a problem that a synchronization difference between a TSN grandmaster clock and a TSN slave clock cannot meet a requirement. As shown in FIG. 17, the communication method may include the following steps.

1701: The UE sends time synchronization information to the RAN device.

The UE may send the time synchronization information to the RAN device in real time or periodically, or may send the time synchronization information to the RAN device when an air interface time synchronization precision needs to be adjusted. The UE network element may include the time synchronization information in a message and send the message to the RAN device, or may directly send the time synchronization information to the RAN device.

Accordingly, the RAN device receives the time synchronization information from the UE.

1702: The RAN device adjusts the air interface time synchronization precision based on the time synchronization information.

Figure 18:
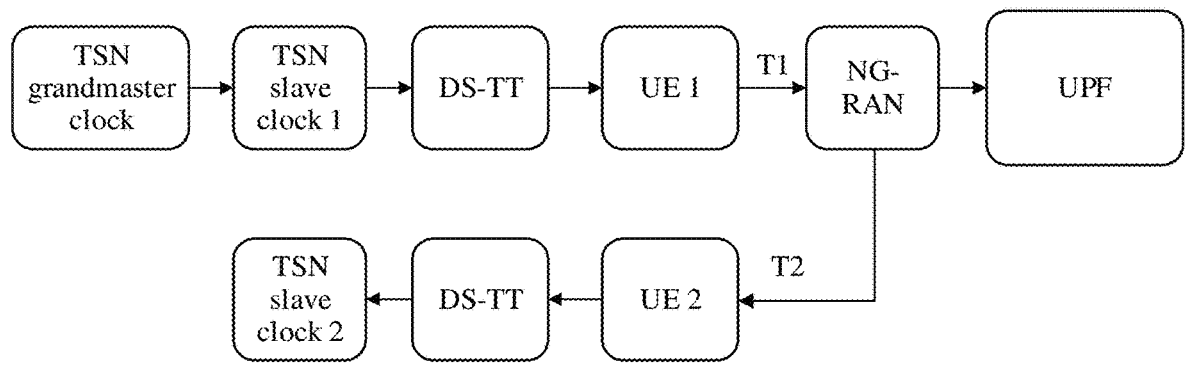
FIG. 18 is another schematic diagram of uplink timing according to an embodiment of the present invention.

After receiving the time synchronization information from the UE, the RAN device may adjust the air interface time synchronization precision based on the time synchronization information. The RAN device may increase the air interface time synchronization precision, or reduce the air interface time synchronization precision. FIG. 18 is another schematic diagram of uplink timing according to an embodiment of the present invention. As shown in FIG. 18, the uplink timing may be performed by a TSN grandmaster clock for a UPF network element, or may be performed by a TSN grandmaster clock for TSN slave clock 2. Herein, the air interface time synchronization precision is adjusted, and a precision difference of the air interface time synchronization precision results from a clock drift between a grandmaster clock in the RAN device and a slave clock in the UE. Therefore, only a time synchronization precision between the UE and the RAN device needs to be discussed, and a time synchronization precision between the RAN device and the UPF network element does not need to be considered. In addition, a difference between a time drift T1 that occurs in an uplink over an air interface and a time drift T2 that occurs in a downlink over an air interface can be ignored.

Optionally, the time synchronization information may be the time synchronization precision between the UE and the access network device.

Optionally, step 1702 may include: adjusting the air interface time synchronization precision when the time synchronization precision that is between the UE and the access network device and that corresponds to the time synchronization information is greater than a threshold.

After receiving the time synchronization information from the UE, the RAN device may determine, based on the time synchronization precision, whether the time synchronization precision between the UE and the RAN device is greater than the threshold. When the RAN device determines that the time synchronization precision between the UE and the RAN device is greater than the threshold, the RAN device may adjust the air interface time synchronization precision, to be specific, increase the air interface time synchronization precision. When the RAN device determines that the time synchronization precision between the UE and the RAN device is less than or equal to the threshold, the RAN device may adjust the air interface time synchronization precision, to be specific, reduce the air interface time synchronization precision or keep the air interface time synchronization precision unchanged.

Optionally, that the RAN device adjusts the air interface time synchronization precision may include: The RAN device sends, to the UE, indication information for adjusting a time synchronization precision, where the indication information is used by the UE to adjust the air interface time synchronization precision. Specifically, the RAN device sends, to the UE, indication information for increasing time synchronization precision, where the indication information is used by the UE to increase the air interface time synchronization precision. The RAN device sends, to the UE, indication information for reducing time synchronization precision, where the indication information is used by the UE to reduce the air interface time synchronization precision.

Optionally, that the indication information is used by the UE to adjust the air interface time synchronization precision may include: The indication information is used by the UE to perform air interface delay compensation or adjust a granularity of a TA. Specifically, that the indication information is used by the UE to increase the air interface time synchronization precision may include: The indication information is used by the UE to perform air interface delay compensation or reduce the granularity of the TA. That the indication information is used by the UE to reduce the air interface time synchronization precision may include: The indication information is used by the UE to perform air interface delay compensation or increase the granularity of the TA.

Optionally, the method may further include: The RAN device sends the time synchronization information to the AMF network element.

After receiving the time synchronization information from the UE, the RAN device may send the time synchronization information to the AMF network element. After the AMF network element receives the time synchronization information from the RAN device, the AMF network element may store the time synchronization information, so that the AMF network element may subsequently determine an appropriate time precision budget between the UPF network element and the RAN device based on the time synchronization information, to reserve a sufficient budget for an air interface.

Optionally, before step 1701, the method may further include: The RAN receives a precision difference of a DS-TT from the DS-TT, and determines the time synchronization information based on the precision difference.

The UE may be connected to a plurality of DS-TTs, and precision differences (namely, precision differences of the DS-TTs) of TSN domains corresponding to different DS-TTs may be different. Therefore, the plurality of DS-TTs connected to the UE may report precision differences of different TSN domains. After receiving the precision difference of the DS-TT from the DS-TT, the UE may determine the time synchronization information based on the precision difference.

Figure 19:
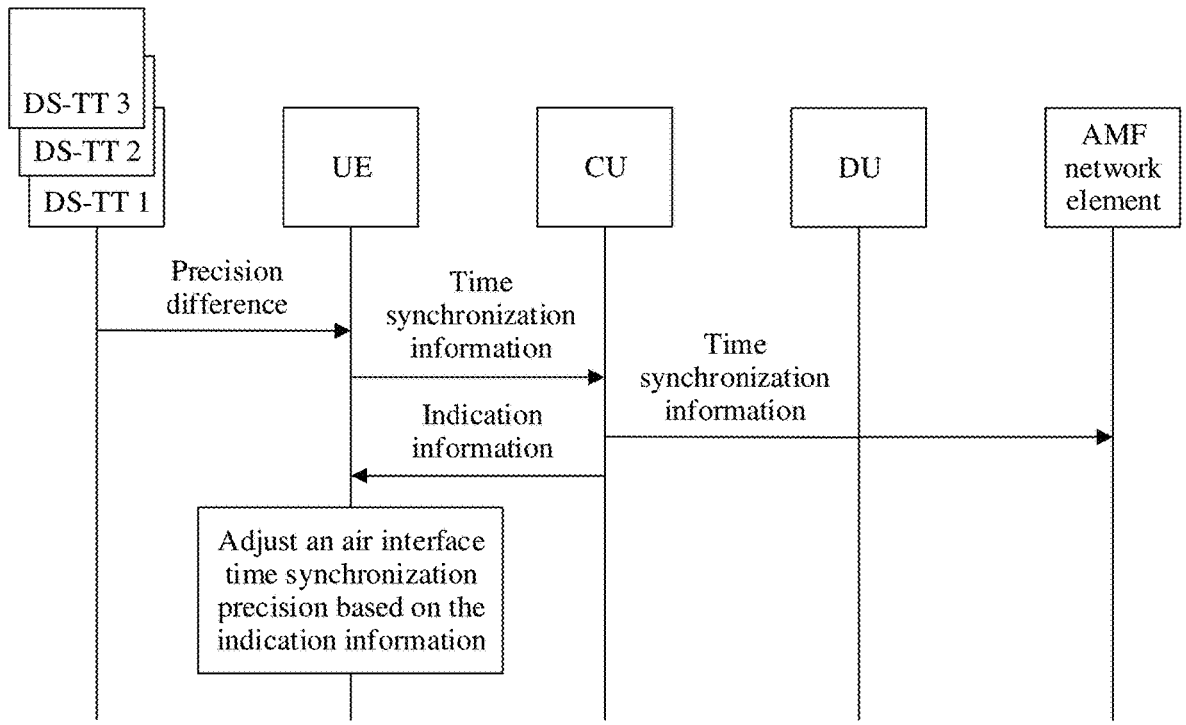
FIG. 19 is a schematic flowchart of still another communication method according to an embodiment of the present invention.

When the RAN device is split into a CU and a DU, refer to FIG. 19. FIG. 19 is a schematic flowchart of still another communication method according to an embodiment of the present invention. As shown in FIG. 19, a DS-TT may send a precision difference of the DS-TT to UE. After receiving the precision difference of the DS-TT from the DS-TT, the UE may determine time synchronization information based on the precision difference of the DS-TT, and send the time synchronization information to the DU. After receiving the time synchronization information from the UE, the DU may determine, based on the synchronization time information, that a time synchronization precision needs to be adjusted, and send indication information to the UE. In addition, the DU may further send the time synchronization information to an AMF network element. After receiving the indication information, the UE may adjust an air interface time synchronization precision based on the indication information.

Figure 20:
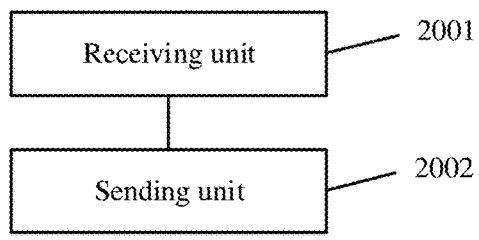
FIG. 20 is a schematic diagram of a structure of a communication apparatus according to an embodiment of the present invention.

Based on the foregoing network architecture, FIG. 20 is a schematic diagram of a structure of a communication apparatus according to an embodiment of the present invention. As shown in FIG. 20, the communication apparatus may include a receiving unit 2001 and a sending unit 2002.

The receiving unit 2001 is configured to receive a first data packet.

The sending unit 2002 is configured to send the first data packet and first indication information to an access network device, where the first indication information indicates that the first data packet is an uplink data packet or a downlink data packet, and the first indication information is used by the access network device to determine an AN PDB of a first QoS flow corresponding to the first data packet.

In an embodiment, when the first data packet is a data packet from the access network device, the first indication information indicates that the first data packet is the uplink data packet; or when the first data packet is a data packet from a TSN application server, the first indication information indicates that the first data packet is the downlink data packet.

In an embodiment, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on a UPF network element.

In an embodiment, the first indication information includes a GTP-U header.

In an embodiment, the receiving unit 2001 is further configured to receive a second data packet, where the first data packet and the second data packet have a same service type, and an uplink or a downlink direction of the first data packet is different from an uplink or a downlink direction of the second data packet.

The sending unit 2002 is further configured to send the second data packet and second indication information to the access network device, where the second indication information indicates that the second data packet is an uplink data packet or a downlink data packet, the second indication information is used by the access network device to determine an AN PDB of a second QoS flow corresponding to the second data packet, and the first QoS flow is different from the second QoS flow.

In an embodiment, the receiving unit 2001 is further configured to receive a third data packet, where the first data packet and the third data packet have a same service type, and an uplink or a downlink direction of the first data packet is different from an uplink or a downlink direction of the third data packet.

That the sending unit 2002 sends the first data packet and the first indication information to the access network device includes: sending the first data packet, the third data packet, the first indication information, and third indication information to the access network device, where the third indication information indicates that the third data packet is an uplink data packet or a downlink data packet.

That the first indication information is used by the access network device to determine an AN PDB of a first QoS flow corresponding to the first data packet includes:

The first indication information and the third indication information are used by the access network device to determine an AN PDB of a first QoS flow corresponding to the first data packet and the third data packet.

In an embodiment, when the first indication information indicates that the first data packet is the uplink data packet, that the first indication information is used by the access network device to determine an AN PDB of a first QoS flow corresponding to the first data packet includes:

The first indication information is used by the access network device to determine, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In an embodiment, when the first indication information indicates that the first data packet is the downlink data packet, that the first indication information is used by the access network device to determine an AN PDB of a first QoS flow corresponding to the first data packet includes:

The first indication information is used by the access network device to determine, based on one or more of a residence time period of the first data packet in a DS-TT, a residence time period of the first data packet in an NW-TT, a residence time period of the first data packet in the UPF network element, a residence time period of the first data packet in UE, and a CN PDB of the first QoS flow, the AN PDB of the first QoS flow corresponding to the first data packet.

For more detailed descriptions of the receiving unit 2001 and the sending unit 2002, directly refer to related descriptions of the UPF network element in the method embodiment shown in FIG. 7, and details are not described herein again.

Figure 21:
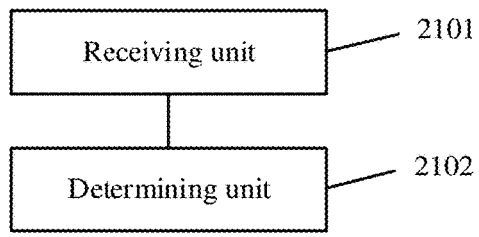
FIG. 21 is a schematic diagram of a structure of another communication apparatus according to an embodiment of the present invention.

Based on the foregoing network architecture, FIG. 21 is a schematic diagram of a structure of another communication apparatus according to an embodiment of the present invention. As shown in FIG. 21, the communication apparatus may include a receiving unit 2101 and a determining unit 2102.

The receiving unit 2101 is configured to receive a first data packet and first indication information from a UPF network element, where the first indication information indicates that the first data packet is an uplink data packet or a downlink data packet.

The determining unit 2102 is configured to determine, based on the first indication information, an AN PDB of a first QoS flow corresponding to the first data packet.

In an embodiment, when the first data packet is a data packet from an access network device, the first indication information indicates that the first data packet is the uplink data packet; or when the first data packet is a data packet from a TSN application server, the first indication information indicates that the first data packet is the downlink data packet.

In an embodiment, when the first data packet is a data packet received through a first port, the first indication information indicates that the first data packet is the uplink data packet; or when the first data packet is a data packet received through a second port, the first indication information indicates that the first data packet is the downlink data packet. The first port and the second port are different ports on the UPF network element.

In an embodiment, the first indication information includes a GTP-U header.

In an embodiment, the receiving unit 2101 is further configured to receive a second data packet and second indication information from the UPF network element, where the second indication information indicates that the second data packet is an uplink data packet or a downlink data packet, the first data packet and the second data packet have a same service type, and an uplink or a downlink direction of the first data packet is different from an uplink or a downlink direction of the second data packet.

The determining unit 2102 is further configured to determine, based on the second indication information, an AN PDB of a second QoS flow corresponding to the second data packet, where the first QoS flow is different from the second QoS flow.

In an embodiment, the receiving unit 2101 is specifically configured to receive the first data packet, a third data packet, the first indication information, and third indication information from the UPF network element, where the third indication information indicates that the third data packet is an uplink data packet or a downlink data packet, the first data packet and the third data packet have a same service type, and an uplink or a downlink direction of the first data packet is different from an uplink or a downlink direction of the third data packet.

The determining unit 2102 is specifically configured to determine, based on the first indication information and the third indication information, an AN PDB of a first QoS flow corresponding to the first data packet and the third data packet.

In an embodiment, when the first indication information indicates that the first data packet is the uplink data packet, that the determining unit 2102 determines, based on the first indication information, the AN PDB of the first QoS flow corresponding to the first data packet includes: determining, based on one or more of a residence time period of the first data packet in a DS-TT, a residence time period of the first data packet in UE, an AN PDB of a third QoS flow, a CN PDB of the third QoS flow, a residence time period of the first data packet in the UPF network element, and a CN PDB of the first QoS flow, the AN PDB of the first QoS flow corresponding to the first data packet, where the third QoS flow is an uplink QoS flow corresponding to the first data packet.

In an embodiment, when the first indication information indicates that the first data packet is the downlink data packet, that the determining unit 2102 determines, based on the first indication information, the AN PDB of the first QoS flow corresponding to the first data packet includes: determining, based on one or more of a residence time period of the first data packet in a DS-TT, a residence time period of the first data packet in an NW-TT, a residence time period of the first data packet in the UPF network element, a residence time period of the first data packet in UE, and a CN PDB of the first QoS flow, the AN PDB of the first QoS flow corresponding to the first data packet.

For more detailed descriptions of the receiving unit 2101 and the determining unit 2102, directly refer to related descriptions of the RAN device in the method embodiment shown in FIG. 7, and details are not described herein again.

Figure 22:
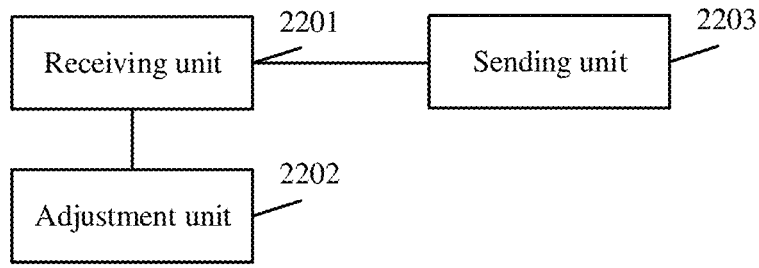
FIG. 22 is a schematic diagram of a structure of still another communication apparatus according to an embodiment of the present invention.

Based on the foregoing network architecture, FIG. 22 is a schematic diagram of a structure of still another communication apparatus according to an embodiment of the present invention. As shown in FIG. 22, the communication apparatus may include a receiving unit 2201 and an adjustment unit 2202.

The receiving unit 2201 is configured to receive time synchronization information.

The adjustment unit 2202 is configured to adjust an air interface time synchronization precision based on the time synchronization information.

In an embodiment, the receiving unit 2201 is specifically configured to receive the time synchronization information from an AMF network element.

In an embodiment, the receiving unit 2201 is specifically configured to receive the time synchronization information from UE.

In an embodiment, the time synchronization information may be: a time synchronization precision between the UE and an access network device; or a time synchronization precision between the UE and a UPF network element, and a time synchronization precision between an access network device and the UPF network element.

In an embodiment, the adjustment unit 2202 is specifically configured to adjust the air interface time synchronization precision when the time synchronization precision that is between the UE and the access network device and that corresponds to the time synchronization information is greater than a threshold.

In an embodiment, that the adjustment unit 2202 adjusts the air interface time synchronization precision includes: sending, to the UE, indication information for adjusting a time synchronization precision, where the indication information is used by the UE to adjust the air interface time synchronization precision.

In an embodiment, that the indication information is used by the UE to adjust the air interface time synchronization precision includes:

The indication information is used by the UE to perform air interface delay compensation or adjust a granularity of a TA.

In an embodiment, the communication apparatus may further include: a sending unit 2203, configured to send the time synchronization information to the AMF network element.

For more detailed descriptions of the receiving unit 2201, the adjustment unit 2202, and the sending unit 2203, directly refer to related descriptions of the RAN device in the method embodiment shown in FIG. 13 or FIG. 17, and details are not described herein again.

Figure 23:
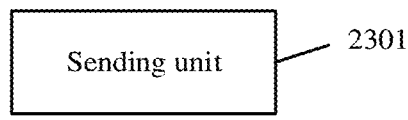
FIG. 23 is a schematic diagram of a structure of still another communication apparatus according to an embodiment of the present invention.

Based on the foregoing network architecture, FIG. 23 is a schematic diagram of a structure of still another communication apparatus according to an embodiment of the present invention. As shown in FIG. 23, the communication apparatus may include a sending unit 2301.

The sending unit 2301 is configured to send time synchronization information to an access network device, where the time synchronization information is used by the access network device to adjust an air interface time synchronization precision.

In an embodiment, the time synchronization information may be: a time synchronization precision between UE and the access network device; or a time synchronization precision between UE and a UPF network element, and a time synchronization precision between the access network device and the UPF network element.

In an embodiment, that the time synchronization information is used by the access network device to adjust an air interface time synchronization precision includes:

The time synchronization information is used by the access network device to adjust the air interface time synchronization precision when the time synchronization precision that is between the UE and the access network device and that corresponds to the time synchronization information is greater than a threshold.

In an embodiment, that the access network device adjusts the air interface time synchronization precision includes:

The access network device sends, to the UE, indication information for adjusting a time synchronization precision, where the indication information is used by the UE to adjust the air interface time synchronization precision.

In an embodiment, that the indication information is used by the UE to adjust the air interface time synchronization precision includes: The indication information is used by the UE to perform air interface delay compensation or adjust a granularity of a TA.

For more detailed descriptions of the sending unit 2301, directly refer to related descriptions of the AMF network element in the method embodiment shown in FIG. 13, and details are not described herein again.

Figure 24:
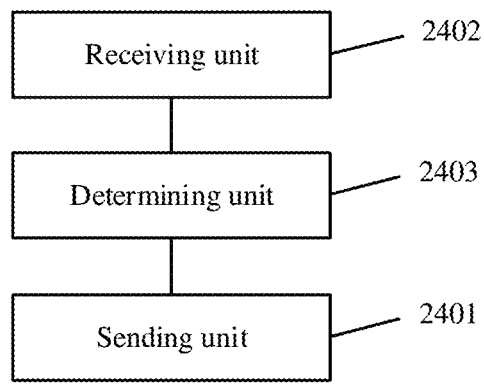
FIG. 24 is a schematic diagram of a structure of still another communication apparatus according to an embodiment of the present invention.

Based on the foregoing network architecture, FIG. 24 is a schematic diagram of a structure of still another communication apparatus according to an embodiment of the present invention. As shown in FIG. 24, the communication apparatus may include a sending unit 2401.

The sending unit 2401 is configured to send time synchronization information to an access network device, where the time synchronization information is used by the access network device to adjust an air interface time synchronization precision.

In an embodiment, the time synchronization information is a time synchronization precision between UE and the access network device.

In an embodiment, that the time synchronization information is used by the access network device to adjust an air interface time synchronization precision includes:

The time synchronization information is used by the access network device to adjust the air interface time synchronization precision when the time synchronization precision that is between the UE and the access network device and that corresponds to the time synchronization information is greater than a threshold.

In an embodiment, that the access network device adjusts the air interface time synchronization precision includes:

The access network device sends, to the UE, indication information for adjusting a time synchronization precision, where the indication information is used by the UE to adjust the air interface time synchronization precision.

In an embodiment, that the indication information is used by the UE to adjust the air interface time synchronization precision includes:

The indication information is used by the UE to perform air interface delay compensation or adjust a granularity of a TA.

In an embodiment, the communication apparatus may further include a receiving unit 2402 and a determining unit 2403.

The receiving unit 2402 is configured to receive a precision difference of a DS-TT from the DS-TT.

The determining unit 2403 is configured to determine the time synchronization information based on the precision difference.

For more detailed descriptions of the sending unit 2401, the receiving unit 2402, and the determining unit 2403, directly refer to related descriptions of the UE in the method embodiment shown in FIG. 17, and details are not described herein again.

Figure 25:
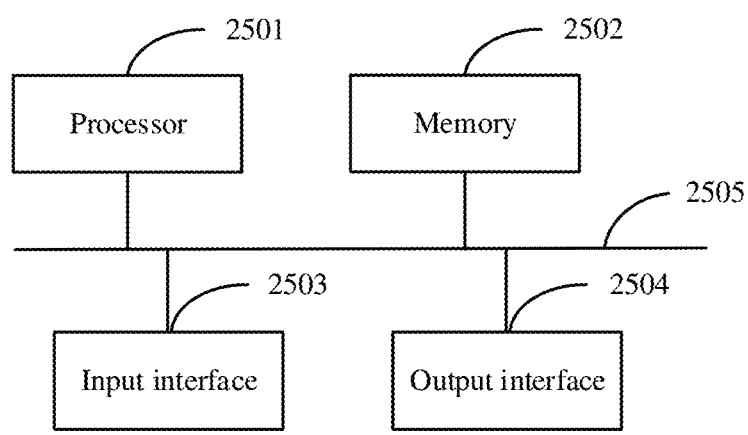
FIG. 25 is a schematic diagram of a structure of still another communication apparatus according to an embodiment of the present invention.

Based on the foregoing network architecture, FIG. 25 is a schematic diagram of a structure of still another communication apparatus according to an embodiment of the present invention. As shown in FIG. 25, the communication apparatus may include a processor 2501, a memory 2502, an input interface 2503, an output interface 2504, and a bus 2505. The processor 2501 may be a general-purpose central processing unit (CPU), a plurality of CPUs, a microprocessor, an application-specific integrated circuit (ASIC), or one or more integrated circuits configured to control program execution of the solutions of the present invention. The memory 2502 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM), another compact disc storage, an optical disc storage (including a compressed optical disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer, but is not limited thereto. The memory 2502 may exist independently, and may be connected to the processor 2501 through the bus 2505. Alternatively, the memory 2502 may be integrated with the processor 2501. The bus 2505 is configured to connect these components.

In an embodiment, the communication apparatus may be a UPF network element or a module (for example, a chip) in the UPF network element. When computer program instructions stored in the memory 2502 are executed, the processor 2501 is configured to control the receiving unit 2001 and the sending unit 2002 to perform the operations performed in the foregoing embodiment. The input interface 2503 is configured to perform the operation performed by the receiving unit 2001 in the foregoing embodiment. The output interface 2504 is configured to perform the operation performed by the sending unit 2002 in the foregoing embodiment. The UPF network element or the module in the UPF network element may be further configured to perform various methods performed by the UPF network element in the method embodiment shown in FIG. 7. Details are not described again.

In an embodiment, the communication apparatus may be an access network device or a module (for example, a chip) in the access network device. When computer program instructions stored in the memory 2502 are executed, the processor 2501 is configured to control the receiving unit 2101 to perform the operation performed in the foregoing embodiment. The processor 2501 is further configured to perform the operation performed by the determining unit 2102 in the foregoing embodiment. The input interface 2503 is configured to perform the operation performed by the receiving unit 2101 in the foregoing embodiment. The output interface 2504 is configured to send information to another communication apparatus. The access network device or the module in the access network device may be further configured to perform various methods performed by the RAN device in the method embodiment shown in FIG. 7. Details are not described again.

In an embodiment, the communication apparatus may be an access network device or a module (for example, a chip) in the access network device. When computer program instructions stored in the memory 2502 are executed, the processor 2501 is configured to control the receiving unit 2201 and the sending unit 2203 to perform the operations performed in the foregoing embodiment. The processor 2501 is further configured to perform the operation performed by the adjustment unit 2202 in the foregoing embodiment. The input interface 2503 is configured to perform the operation performed by the receiving unit 2201 in the foregoing embodiment. The output interface 2504 is configured to perform the operation performed by the sending unit 2203 in the foregoing embodiment. The access network device or the module in the access network device may be further configured to perform various methods performed by the RAN device in the method embodiment shown in FIG. 13 or FIG. 17. Details are not described again.

In an embodiment, the communication apparatus may be an AMF network element or a module (for example, a chip) in the AMF network element. When computer program instructions stored in the memory 2502 are executed, the processor 2501 is configured to control the sending unit 2301 to perform the operation performed in the foregoing embodiment. The input interface 2503 is configured to receive information from another communication apparatus. The output interface 2504 is configured to perform the operation performed by the sending unit 2301 in the foregoing embodiment. The AMF network element or the module in the AMF network element may be further configured to perform various methods performed by the AMF network element in the method embodiment shown in FIG. 13. Details are not described again.

In an embodiment, the communication apparatus may be UE or a module (for example, a chip) in the UE. When computer program instructions stored in the memory 2502 are executed, the processor 2501 is configured to control the sending unit 2401 and the receiving unit 2402 to perform the operations performed in the foregoing embodiment. The processor 2501 is further configured to perform the operation performed by the determining unit 2403 in the foregoing embodiment. The input interface 2503 is configured to perform the operation performed by the receiving unit 2402 in the foregoing embodiment. The output interface 2504 is configured to perform the operation performed by the sending unit 2401 in the foregoing embodiment. The UE or the module in the UE may be further configured to perform various methods performed by the UE in the method embodiment shown in FIG. 17. Details are not described again.

Figure 26:
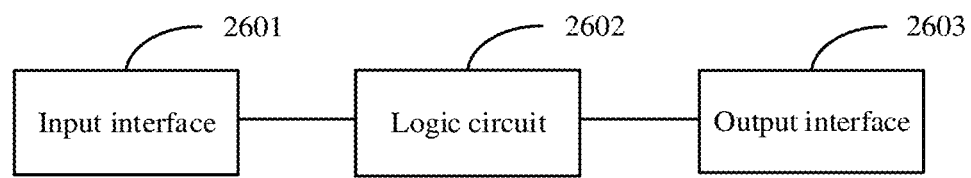
FIG. 26 is a schematic diagram of a structure of still another communication apparatus according to an embodiment of the present invention.

FIG. 26 is a schematic diagram of a structure of still another communication apparatus according to an embodiment of the present invention. As shown in FIG. 26, the communication apparatus may include an input interface 2601, a logic circuit 2602, and an output interface 2603. The input interface 2601 is connected to the output interface 2603 through the logic circuit 2602. The input interface 2601 is configured to receive information from another communication apparatus, and the output interface 2603 is configured to output, schedule, or send information to another communication apparatus. The logic circuit 2602 is configured to perform an operation other than the operations performed by the input interface 2601 and the output interface 2603, for example, implement a function that is implemented by the processor 2501 in the foregoing embodiment. The communication apparatus may be a terminal device or a module in the terminal device, or may be a network device or a module in the network device. For more detailed descriptions of the input interface 2601, the logic circuit 2602, and the output interface 2603, directly refer to related descriptions of the UPF network element or the module in the UPF network element, the RAN device or the module in the RAN device, the AMF network element or the module in the AMF network element, and the UE or the module in the UE that are in the foregoing method embodiments. Details are not described herein again.

An embodiment of the present invention further discloses a computer-readable storage medium. The computer-readable storage medium stores computer-readable instructions. When the instructions are executed, the method in the foregoing method embodiment is performed.

An embodiment of the present invention further discloses a computer program product including instructions. When the instructions are executed, the method in the foregoing method embodiment is performed.

An embodiment of the present invention further discloses a communication system. The communication system may include a UPF network element and a RAN device. For specific descriptions, refer to the communication method shown in FIG. 7.

An embodiment of the present invention further discloses a communication system. The communication system may include an AMF network element and a RAN device. For specific descriptions, refer to the communication method shown in FIG. 13.

An embodiment of the present invention further discloses a communication system. The communication system may include UE and a RAN device. For specific descriptions, refer to the communication method shown in FIG. 17.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method, comprising:
receiving a first data packet by a user plane function (UPF) network element;
determining, by the UPF network element, whether the first data packet is an uplink data packet or a downlink data packet based on a device that sent the first data packet;
generating, by the UPF network element, first indication information that indicates that the first data packet is the uplink data packet, or indicates that the first data packet is the downlink data packet; and
sending, by the UPF network element, the first data packet and the first indication information to an access network device, wherein the first indication information is used by the access network device to determine an access network (AN) packet delay budget (PDB) of a first quality of service (QOS) flow corresponding to the first data packet.

2. The method according to claim 1, wherein:
when the first data packet is received by the UPF network element from the access network device, the first indication information indicates that the first data packet is the uplink data packet.

3. The method according to claim 1, wherein:
when the first data packet is received by the UPF network element from a time sensitive network (TSN) application server, the first indication information indicates that the first data packet is the downlink data packet.

4. The method according to claim 1, further comprising:
receiving, by the UPF network element, a second data packet, wherein the first data packet and the second data packet have a same service type, and an uplink or a downlink direction of the first data packet is different from an uplink or a downlink direction of the second data packet; and
sending, by the UPF network element, the second data packet and second indication information to the access network device, wherein the second indication information indicates that the second data packet is an uplink data packet or indicates that the second data packet is a downlink data packet, the second indication information is used by the access network device to determine an AN PDB of a second QoS flow corresponding to the second data packet, and the first QoS flow is different from the second QoS flow.

5. The method according to claim 1, further comprising:
receiving, by the UPF network element, a third data packet, wherein the first data packet and the third data packet have a same service type, and an uplink or a downlink direction of the first data packet is different from an uplink or a downlink direction of the third data packet; and
wherein sending, by the UPF network element, the first data packet and the first indication information to the access network device comprises:
sending, by the UPF network element, the first data packet, the third data packet, the first indication information, and third indication information to the access network device, wherein the third indication information indicates that the third data packet is an uplink data packet or indicates that the third data packet is a downlink data packet; and
wherein the first indication information being used by the access network device to determine the AN PDB of the first QoS flow corresponding to the first data packet comprises:
the first indication information and the third indication information are used by the access network device to determine the AN PDB of the first QOS flow, and the first QoS flow corresponds to the first data packet and the third data packet.

6. The method according to claim 1, wherein when the first indication information indicates that the first data packet is the uplink data packet, that the first indication information is used by the access network device to determine the AN PDB of the first QoS flow corresponding to the first data packet comprises:
the first indication information is used by the access network device to determine, based on one or more of a residence time period of the first data packet in a device-side time sensitive network (TSN) translator (DS-TT), a residence time period of the first data packet in user equipment (UE), an AN PDB of a third QoS flow, a core network (CN) PDB of the third Qos flow, a residence time period of the first data packet in the UPF network element, or a CN PDB of the first QoS flow, the AN PDB of the first QoS flow corresponding to the first data packet, wherein the third QoS flow is an uplink QoS flow corresponding to the first data packet.

7. The method according to claim 1, wherein when the first indication information indicates that the first data packet is the downlink data packet, that the first indication information is used by the access network device to determine the AN PDB of the first QoS flow corresponding to the first data packet comprises:
the first indication information is used by the access network device to determine, based on one or more of a residence time period of the first data packet in a device-side time sensitive network (TSN) translator (DS-TT), a residence time period of the first data packet in a network-side time sensitive network (TSN) translator (NW-TT), a residence time period of the first data packet in the UPF network element, a residence time period of the first data packet in user equipment (UE), or a core network (CN) PDB of the first QoS flow, the AN PDB of the first QoS flow corresponding to the first data packet.

8. An apparatus, wherein the apparatus is a user plane function (UPF) network element or is applied to a UPF network element, and the apparatus comprising:
at least one processor; and
a non-transitory computer readable storage medium storing a program that is executable by the at least one processor, the program including instructions to:
receive a first data packet;
determine whether the first data packet is an uplink data packet or a downlink data packet based on a device that sent the first data packet;
generate first indication information that indicates that the first data packet is the uplink data packet or indicates that the first data packet is the downlink data packet; and
send the first data packet and the first indication information to an access network device, wherein the first indication information is used by the access network device to determine an access network (AN) packet delay budget (PDB) of a first quality of service (QOS) flow corresponding to the first data packet.

9. The apparatus according to claim 8, wherein:
when the first data packet is a data packet from the access network device, the first indication information indicates that the first data packet is the uplink data packet.

10. The apparatus according to claim 8, wherein:
when the first data packet is a data packet from a time sensitive network (TSN) application server, the first indication information indicates that the first data packet is the downlink data packet.

11. The apparatus according to claim 8, wherein the program further includes instructions to:
receive a second data packet, wherein the first data packet and the second data packet have a same service type, and an uplink or a downlink direction of the first data packet is different from an uplink or a downlink direction of the second data packet; and
send the second data packet and second indication information to the access network device, wherein the second indication information indicates that the second data packet is an uplink data packet or indicates that the second data packet is a downlink data packet, the second indication information is used by the access network device to determine an AN PDB of a second QoS flow corresponding to the second data packet, and the first QoS flow is different from the second QoS flow.

12. The apparatus according to claim 8, wherein the program further includes instructions to:
receive a third data packet, wherein the first data packet and the third data packet have a same service type, and an uplink or a downlink direction of the first data packet is different from an uplink or a downlink direction of the third data packet; and
wherein sending the first data packet and the first indication information to the access network device comprises:
sending the first data packet, the third data packet, the first indication information, and third indication information to the access network device, wherein the third indication information indicates that the third data packet is an uplink data packet or indicates that the third data packet is a downlink data packet; and
wherein the first indication information being used by the access network device to determine the AN PDB of the first QoS flow corresponding to the first data packet comprises:
the first indication information and the third indication information being used by the access network device to determine an AN PDB of the first QoS flow, and the first QoS flow corresponds to the first data packet and the third data packet.

13. The apparatus according to claim 8, wherein when the first indication information indicates that the first data packet is the uplink data packet, the first indication information being used by the access network device to determine the AN PDB of the first QoS flow corresponding to the first data packet comprises:
the first indication information being used by the access network device to determine, based on one or more of a residence time period of the first data packet in a device-side time sensitive network (TSN) translator (DS-TT), a residence time period of the first data packet in user equipment (UE), an AN PDB of a third QoS flow, a core network (CN) PDB of the third QoS flow, a residence time period of the first data packet in the UPF network element, or a CN PDB of the first QoS flow, the AN PDB of the first QoS flow corresponding to the first data packet, wherein the third QoS flow is an uplink QoS flow corresponding to the first data packet.

14. The apparatus according to claim 8, wherein when the first indication information indicates that the first data packet is the downlink data packet, the first indication information being used by the access network device to determine the AN PDB of the first QoS flow corresponding to the first data packet comprises:
the first indication information is used by the access network device to determine, based on one or more of a residence time period of the first data packet in a device-side time sensitive network (TSN) translator (DS-TT), a residence time period of the first data packet in a network-side TSN translator (NW-TT), a residence time period of the first data packet in the UPF network element, a residence time period of the first data packet in user equipment (UE), or a core network (CN) PDB of the first QoS flow, the AN PDB of the first QoS flow corresponding to the first data packet.

15. An apparatus, comprising:
at least one processor; and
a non-transitory computer readable storage medium storing a program that is executable by the at least one processor, the program including instructions to:
receive a first data packet and first indication information from a user plane function (UPF) network element, wherein the first indication information indicates that the first data packet is an uplink data packet or indicates that the first data packet is a downlink data packet, wherein the UPF network element determines whether the first data packet is the uplink data packet or the downlink data packet based on a device that sent the first data packet, and the UPF network element generates the first indication information; and determine, based on the first indication information, an access network (AN) packet delay budget (PDB) of a first quality of service (QOS) flow corresponding to the first data packet.

16. The apparatus according to claim 15, wherein:
when the first data packet is a data packet from an access network device, the first indication information indicates that the first data packet is the uplink data packet.

17. The apparatus according to claim 15, wherein:
when the first data packet is a data packet from a time sensitive network (TSN) application server, the first indication information indicates that the first data packet is the downlink data packet.

18. The apparatus according to claim 15, wherein the program further includes instructions to:
receive a second data packet and second indication information from the UPF network element, wherein the second indication information indicates that the second data packet is an uplink data packet or indicates that the second data packet is a downlink data packet, the first data packet and the second data packet have a same service type, and an uplink or a downlink direction of the first data packet is different from an uplink or a downlink direction of the second data packet; and
determine, based on the second indication information, an AN PDB of a second QoS flow corresponding to the second data packet, wherein the first QoS flow is different from the second QoS flow.

19. The apparatus according to claim 15, wherein the program further includes instructions to:
receive a third data packet and third indication information from the UPF network element, wherein the third indication information indicates that the third data packet is an uplink data packet or indicates that the third data packet is a downlink data packet, the first data packet and the third data packet have a same service type, and an uplink or a downlink direction of the first data packet is different from an uplink or a downlink direction of the third data packet; and
wherein determining, based on the first indication information, the AN PDB of the first QoS flow corresponding to the first data packet comprises:
determining, based on the first indication information and the third indication information, an AN PDB of the first QoS flow, wherein the first QoS flow corresponds to the first data packet and the third data packet.

20. The apparatus according to claim 15, wherein when the first indication information indicates that the first data packet is the uplink data packet, determining, based on the first indication information, the AN PDB of the first QoS flow corresponding to the first data packet comprises:
determining, based on one or more of a residence time period of the first data packet in a device-side time sensitive network (TSN) translator (DS-TT), a residence time period of the first data packet in user equipment (UE), an AN PDB of a third QoS flow, a core network (CN) PDB of the third QoS flow, a residence time period of the first data packet in the UPF network element, and a core network (CN) PDB of the first QoS flow, the AN PDB of the first QoS flow corresponding to the first data packet, wherein the third QoS flow is an uplink QoS flow corresponding to the first data packet.

* * * * *